(12) United States Patent
Takase et al.

(10) Patent No.: US 10,587,006 B2
(45) Date of Patent: Mar. 10, 2020

(54) RECHARGEABLE LITHIUM ION BATTERY, AND MANUFACTURING METHOD FOR RECHARGEABLE LITHIUM ION BATTERY

(71) Applicant: SAMSUNG SDI CO., LTD., Yongin-si, Gyeonggi-do (KR)

(72) Inventors: Hironari Takase, Yokohama (JP); Hokuto Yokotsuji, Yokohama (JP)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 661 days.

(21) Appl. No.: 14/525,736

(22) Filed: Oct. 28, 2014

(65) Prior Publication Data

US 2015/0118581 A1 Apr. 30, 2015

(30) Foreign Application Priority Data

Oct. 29, 2013 (JP) ................................. 2013-224016
Dec. 5, 2013 (JP) ................................. 2013-252175
Aug. 20, 2014 (KR) ........................ 10-2014-0108631

(51) Int. Cl.
*H01M 4/583* (2010.01)
*H01M 4/38* (2006.01)
*H01M 4/48* (2010.01)
*H01M 10/0567* (2010.01)
*H01M 10/0525* (2010.01)
(Continued)

(52) U.S. Cl.
CPC ....... *H01M 10/0567* (2013.01); *H01M 4/386* (2013.01); *H01M 4/485* (2013.01); *H01M 4/587* (2013.01); *H01M 10/052* (2013.01); *H01M 10/0525* (2013.01); *H01M 10/0569* (2013.01); *H01M 2300/0025* (2013.01); *Y02T 10/7011* (2013.01)

(58) Field of Classification Search
CPC ........ H01M 4/583; H01M 4/386; H01M 4/48; H01M 10/0525; H01M 10/0567; H01M 10/0569
See application file for complete search history.

(56) References Cited

U.S. PATENT DOCUMENTS

2006/0286459 A1* 12/2006 Zhao ..................... H01M 4/131
429/326
2007/0048607 A1* 3/2007 Nakashima ........... H01M 2/166
429/209
(Continued)

FOREIGN PATENT DOCUMENTS

CN 101202360 A1 * 6/2008 ............ H01M 10/40
JP 09-120837 A 5/1997
(Continued)

OTHER PUBLICATIONS

Machine Translation of: JP 2013-053105 A, Araki et al., Mar. 21, 2013.*
(Continued)

*Primary Examiner* — Kenneth J Douyette
(74) *Attorney, Agent, or Firm* — Lee IP Law, PC

(57) ABSTRACT

A rechargeable lithium ion battery including a negative active material, the negative active material including a carbon-based active material, and an electrolyte solution that includes a S=O-containing compound, the S=O-containing compound having a structure that is selected according to a G band/D band ratio of the carbon-based active material.

18 Claims, 9 Drawing Sheets

(51) Int. Cl.
*H01M 10/0569* (2010.01)
*H01M 10/052* (2010.01)
*H01M 4/485* (2010.01)
*H01M 4/587* (2010.01)

(56) References Cited

U.S. PATENT DOCUMENTS

| | | | | |
|---|---|---|---|---|
| 2007/0077490 A1* | 4/2007 | Kim | ................ | C04B 35/62615 |
| | | | | 429/218.1 |
| 2007/0178379 A1 | 8/2007 | Tamura et al. | | |
| 2009/0004564 A1 | 1/2009 | Ishida et al. | | |
| 2009/0181296 A1* | 7/2009 | Lampe-Onnerud | ... | H01M 4/131 |
| | | | | 429/160 |
| 2009/0226808 A1* | 9/2009 | Hiwara | ................ | H01G 9/038 |
| | | | | 429/200 |
| 2009/0280413 A1* | 11/2009 | Ohta | ................ | H01M 4/133 |
| | | | | 429/231.8 |
| 2010/0086856 A1* | 4/2010 | Matsumoto | ......... | H01M 4/1393 |
| | | | | 429/231.8 |
| 2011/0053003 A1* | 3/2011 | Deguchi | ............. | H01M 4/0404 |
| | | | | 429/336 |
| 2012/0009452 A1* | 1/2012 | Ueda | ................ | H01M 4/13 |
| | | | | 429/94 |
| 2012/0028128 A1* | 2/2012 | Seino | ................ | C01G 45/1228 |
| | | | | 429/304 |
| 2012/0164542 A1* | 6/2012 | Iwaya | ................ | H01G 9/038 |
| | | | | 429/326 |
| 2012/0244427 A1* | 9/2012 | Hashimoto | ............. | C08F 16/14 |
| | | | | 429/200 |
| 2012/0315551 A1* | 12/2012 | Bhat | ................ | H01M 10/052 |
| | | | | 429/339 |
| 2013/0040203 A1* | 2/2013 | Yoon | ................ | C01B 31/04 |
| | | | | 429/231.8 |
| 2013/0089784 A1* | 4/2013 | Cho | ................ | H01M 4/133 |
| | | | | 429/213 |
| 2013/0122378 A1 | 5/2013 | Oh et al. | | |
| 2013/0149606 A1 | 6/2013 | Yasuda et al. | | |
| 2013/0266847 A1* | 10/2013 | Noguchi | ............ | H01M 10/0525 |
| | | | | 429/163 |
| 2014/0349187 A1 | 11/2014 | Hirose et al. | | |

FOREIGN PATENT DOCUMENTS

| | | |
|---|---|---|
| JP | 2004-281073 A | 10/2004 |
| JP | 2005-243508 A | 9/2005 |
| JP | 2009-176534 A | 8/2009 |
| JP | 2012-38737 A | 2/2012 |
| JP | 2012-178287 A | 9/2012 |
| JP | 2013-053105 A1 * | 3/2013 ........... C07D 257/04 |
| JP | 2013-105745 A | 5/2013 |
| JP | 2013-131325 A | 7/2013 |
| KR | 10-2007-0088534 A | 8/2007 |
| KR | 10-2013-0061733 A | 6/2013 |
| WO | WO 99-16144 A | 4/1999 |
| WO | WO 2011-030832 A1 | 3/2011 |

OTHER PUBLICATIONS

Abstract of: JP 2013-053105 A, Araki et al., Mar. 21, 2013.*
Full Abstract in English of: Fu, Li, CN-101202360 A1, Jun. 18, 2008.*
Japanese Office action dated Sep. 5, 2017 for corresponding Japanese Patent Application No. 2013-224016.

* cited by examiner

RECHARGEABLE LITHIUM ION BATTERY, AND MANUFACTURING METHOD FOR RECHARGEABLE LITHIUM ION BATTERY

CROSS-REFERENCE TO RELATED APPLICATIONS

Japanese Patent Application Nos. 2013-224016, filed on Oct. 29, 2013, and 2013-252175, filed on Dec. 5, 2013, in the Japanese Patent Office, and Korean Patent Application No. 10-2014-0108631 filed on Aug. 20, 2014, in the Korean Intellectual Property Office, and entitled: "Rechargeable Lithium Ion Battery, and Manufacturing Method for Rechargeable Lithium Ion Battery," are incorporated by reference herein in their entirety.

BACKGROUND

1. Field

Embodiments relate to a rechargeable lithium ion battery and a method of manufacturing the rechargeable lithium ion battery.

2. Description of the Related Art

A metal-based or metalloid-based active material, e.g., a silicon-based active material, a tin-based active material, or the like, has been considered for a negative active material, in order to help improve energy density of a rechargeable lithium ion battery for a portable device such as a smart phone, a smart tablet, or the like and an electric vehicle, like a conventional rechargeable lithium ion battery for a laptop.

SUMMARY

Embodiments are directed to a rechargeable lithium ion battery and a method of manufacturing the rechargeable lithium ion battery.

The embodiments may be realized by providing a rechargeable lithium ion battery including a negative active material, the negative active material including a carbon-based active material, and an electrolyte solution that includes a S=O-containing compound, the S=O-containing compound having a structure that is selected according to a G band/D band ratio of the carbon-based active material.

The G band/D band ratio of the carbon-based active material may be greater than 2, the electrolyte solution may include at least one S=O-containing compound represented by one of the following Chemical Formulae 1 to 3:

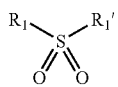

[Chemical Formula 1]

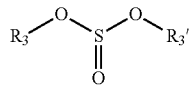

[Chemical Formula 2]

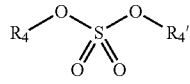

[Chemical Formula 3]

$R_1$ and $R_1'$ may be each independently a substituted or unsubstituted hydrocarbon group having a carbon number of 1 or 2, $R_3$ and $R_3'$ may be each independently a substituted or unsubstituted hydrocarbon group having a carbon number of 1 or 2, and $R_4$ and $R_4'$ may be each independently a substituted or unsubstituted hydrocarbon group having a carbon number of 1 or 2.

The G band/D band ratio of the carbon-based active material may be less than or equal to 2, the electrolyte solution may include at least one S=O-containing compound represented by the following Chemical Formula 4 or 5:

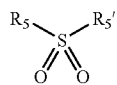

[Chemical Formula 4]

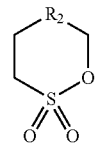

[Chemical Formula 5]

one of $R_5$ or $R_5'$ may be a substituted or unsubstituted hydrocarbon group having a carbon number of 3 or more, and another of $R_5$ or $R_5'$ may be a substituted or unsubstituted hydrocarbon group having a carbon number of 1 or 2, and $R_2$ may be a substituted or unsubstituted hydrocarbon group having a carbon number of 1 or more.

The electrolyte solution may further include an additive, the additive including a compound represented by one of the following Chemical Formula 1a or 1b:

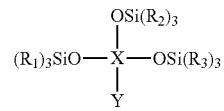

[Chemical Formula 1a]

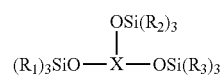

[Chemical Formula 1b]

X may be a Group 13 element, a Group 14 element, or a Group 15 element, Y may be a Group 16 element, and $R_1$ to $R_3$ may be each independently a substituted or unsubstituted C1 to C4 alkyl group.

The electrolyte solution may further include an additive, the additive including a compound represented by the following Chemical Formula 2a:

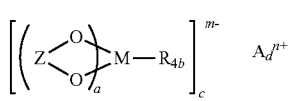

[Chemical Formula 2a]

A may be a Group 1A element, a Group 2A element, or aluminum, M may be a transition metal, a Group 3B element, a Group 4B element, or a Group 5B element, $R_4$ may be a halogen, Z may be —OC—$R_{51}$—CO—, —OC—C($R_{52}$)$_2$—, or —OC—CO—, in which $R_{51}$ is an alkylene group, a halogenated alkylene group, an arylene group, or a halogenated arylene group, and each $R_{52}$ is independently an alkyl group, a halogenated alkyl group, an aryl group, or a halogenated aryl group, a may be an integer of 1 to 4, b may be 0, 2, or 4, and c, d, m, and n may be each independently integers of 1 to 3.

The electrolyte solution may include a first additive, the first additive including a compound represented by one of Chemical Formula 1a or 1b, and a second additive, the second additive including a compound represented by Chemical Formula 2a:

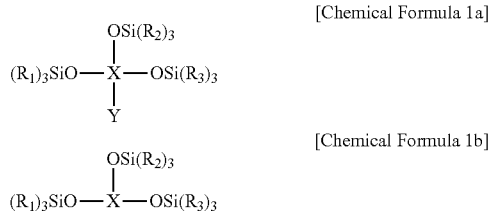

[Chemical Formula 1a]

[Chemical Formula 1b]

X may be a Group 13 element, a Group 14 element, or a Group 15 element, Y may be a Group 16 element, and $R_1$ to $R_3$ may be each independently a substituted or unsubstituted C1 to C4 alkyl group,

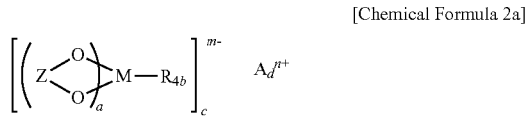

[Chemical Formula 2a]

A may be a Group 1A element, a Group 2A element, or aluminum, M may be a transition metal, a Group 3B element, a Group 4B element, or a Group 5B element, $R_4$ may be a halogen, Z may be —OC—$R_{51}$—CO—, —OC—C($R_{52}$)$_2$—, or —OC—CO—, in which $R_{51}$ is an alkylene group, a halogenated alkylene group, an arylene group, or a halogenated arylene group, and each $R_{52}$ is independently an alkyl group, a halogenated alkyl group, an aryl group, or a halogenated aryl group, a may be an integer of 1 to 4, b may be 0, 2, or 4, and c, d, m, and n may be each independently integers of 1 to 3.

X may be boron or phosphorus, and Y may be oxygen.

The additive may include tris(trifluoromethyl)phosphoric acid.

M may be boron or phosphorus.

The additive may include at least one of lithium difluoro(oxalato-O,O')borate and lithium difluoro bis(oxalato-O,O')phosphate.

The additive may be included in the electrolyte solution in an amount of about 1 wt % to about 4 wt %, based on a total weight of the electrolyte solution.

The additive may be included in the electrolyte solution in an amount of greater than or equal to about 0.25 wt %, based on a total weight of the electrolyte solution.

The first additive may be included in the electrolyte solution in an amount of about 1 wt % to about 4 wt %, based on a total weight of the electrolyte solution, the second additive may be included in the electrolyte solution in an amount of greater than or equal to about 0.25 wt %, based on the total weight of the electrolyte solution, and a total weight of the first additive and the second additive in the electrolyte solution may be less than or equal to 5 wt %, based on the total weight of the electrolyte solution.

The electrolyte solution may include hydrofluoroether.

The electrolyte solution may include at least one of a linear carbonate ester or a fluoro ethylene carbonate.

The negative active material may include a silicon-based active material.

The silicon-based active material may include Si, a Si-based alloy, $SiO_x$, in which $0<x<2$, or a combination thereof.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
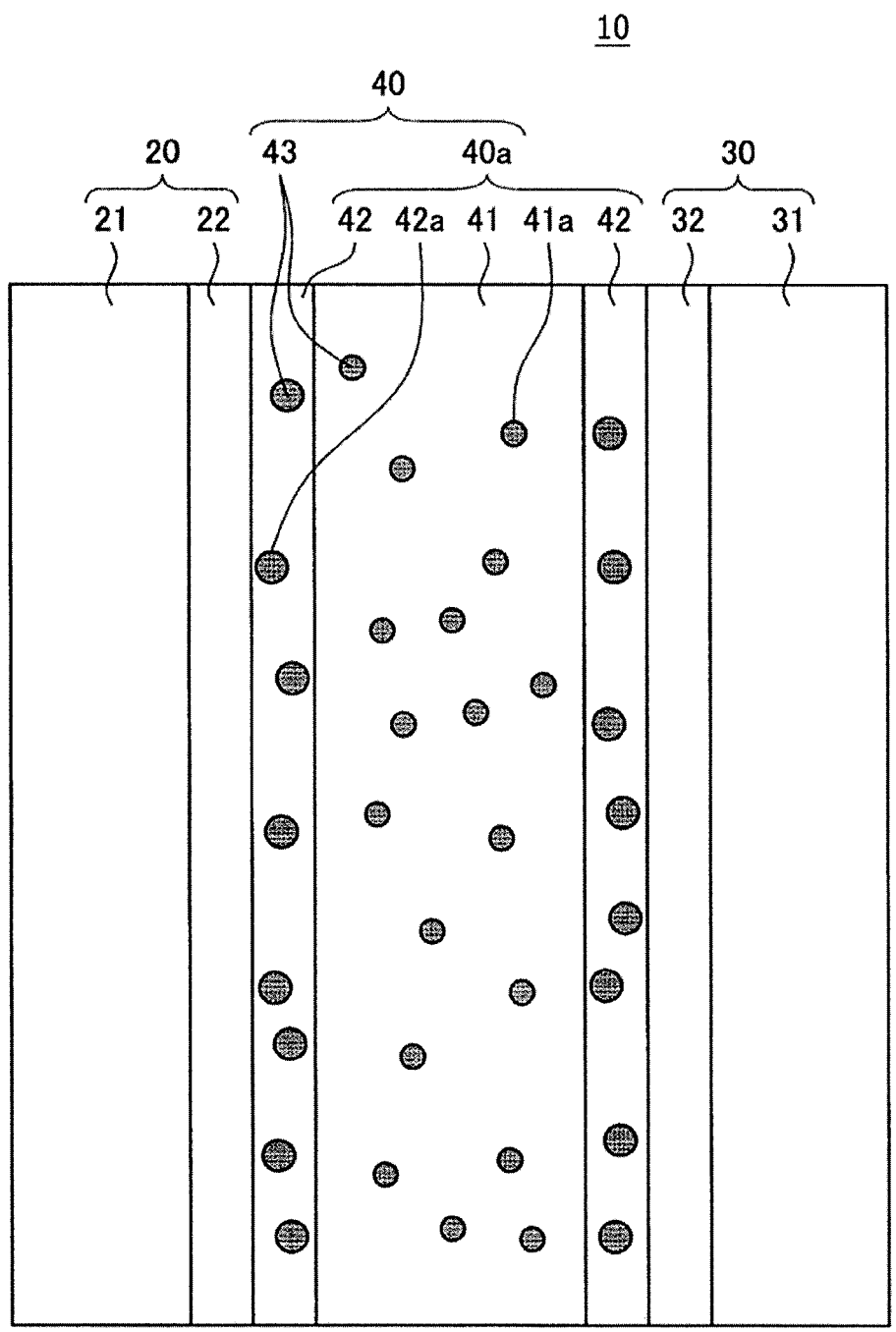
FIG. 1 illustrates a cross-sectional view of a rechargeable lithium ion battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Structure of Rechargeable Lithium Ion Battery

The structures of a rechargeable lithium ion battery 10 according to an embodiment are described with a reference with FIG. 1.

A rechargeable lithium ion battery 10 may include a positive electrode 20, a negative electrode 30, and a separator layer 40. The rechargeable lithium ion battery 10 may have a charge-reaching voltage of (e.g., an oxidation reduction potential), for example, greater than or equal to about 4.3 V (vs. Li/Li$^+$) and less than or equal to about 5.0 V, e.g., greater than or equal to about 4.5 V and less than or equal to about 5.0 V. The rechargeable lithium ion battery 10 has no particular limit to a shape. For example, the rechargeable lithium ion battery 10 may have a suitable shape such as a cylinder, a prism laminate-type, a button, and the like.

The positive electrode 20 may include a current collector 21 and a positive active material layer 22.

The current collector 21 may be a suitable conductor, and may include, e.g., aluminum, stainless steel, or nickel plated steel. The positive active material layer 22 may include at least one positive active material, and may further include a conductive agent a binder.

The positive active material may include, e.g., a lithium-containing solid solution oxide. In an implementation, the positive active material may include a suitable material that electrochemically intercalates and deintercalates lithium ions without limitation.

The solid solution oxide may include, e.g., $Li_aMn_xCo_yNi_zO_2$ ($1.150 \leq a \leq 1.430$, $0.45 \leq x \leq 0.6$, $0.10 \leq y \leq 0.15$, $0.20 \leq z \leq 0.28$), $LiMn_xCo_yNi_zO_2$ ($0.3 \leq x \leq 0.85$, $0.10 \leq y \leq 0.3$, and $0.10 \leq z \leq 0.3$), or $LiMn_{1.5}Ni_{0.5}O_4$.

The positive active material may be included in the positive electrode in an amount of, e.g., about 85 wt % to about 96 wt % or about 88 wt % to about 94 wt %, based on a total weight of the positive electrode active mass (e.g., the positive active material, the binder, and the conductive agent). When the positive active material is included within the range, battery characteristics (e.g., cycle-life and storage capacity) may be particularly improved.

The conductive agent may include, e.g., carbon black Ketjen black, acetylene black, or the like, natural graphite, artificial graphite, or the like. In an implementation, the conductive agent may include a suitable material that helps improve conductivity of a positive electrode.

The conductive agent may be included in the positive active material in an amount of, e.g., about 3 wt % to about 10 wt % or about 4 wt % to about 6 wt %, based on the total weight of the positive electrode active mass. When the conductive agent is included within the range, battery characteristics may be particularly improved.

The binder may include, e.g., polyvinylidene fluoride, an ethylene-propylene-diene terpolymer, a styrene-butadiene rubber, an acrylonitrile-butadiene rubber, fluororubber, polyvinyl acetate, polymethyl methacrylate, polyethylene, nitrocellulose, or the like. In an implementation, the binder may include a suitable material that binds the positive active material and the conductive agent on the current collector 21.

The binder may be included in the positive electrode active material in an amount of, e.g., about 3 wt % to about 7 wt % or about 4 wt % to about 6 wt %, based on the total weight of the positive electrode active mass. When the binder is included within the range, battery characteristics may be particularly improved.

The positive active material layer 22 may have a suitable density ($g/cm^3$), e.g., about 2.0 to about 3.0 or about 2.5 to about 3.0. When the positive active material layer 22 has density within the range, battery characteristics may be particularly improved.

Maintaining the density at about 3.0 $g/cm^3$ or less may help prevent destruction of particles of the positive active material, thereby helping to prevent a loss in an electric contact among themselves. As a result, a utilization rate of the positive active material may be maintained and original discharge capacity may be obtained or maintained, and undesirable polarization may be avoided. In addition, charging of the positive active material up to greater than or equal to a predetermined potential may be avoided, thereby reducing and/or preventing decomposition of an electrolyte solution or elution of a transition metal as an active material, and preventing a deterioration in cycle characteristics. In this view, the positive active material layer 22 may have desirable density within the range.

The density of the positive active material layer 22 may be obtained by dividing planar density of the positive active material layer 22 after the compression by a thickness of the positive active material layer 22 after the compression.

The positive active material layer 22 may be manufactured, e.g., according the following method. For example, a positive electrode active mass may first be manufactured by dry-mixing a positive active material, a conductive agent, and a binder. Subsequently, the positive electrode active mass may be dispersed in a suitable organic solvent to form a positive electrode active mass slurry, and the positive electrode active mass slurry may be coated on a current collector 21, dried, and compressed to form a positive active material layer.

The negative electrode 30 may include a current collector 31 and a negative active material layer 32. The current collector 31 may include a suitable conductor, e.g., aluminum, stainless steel, or nickel plated steel.

The negative active material layer 32 may include at least one negative active material, and may further include a binder. The negative active material may include, e.g., a silicon-containing silicon-based active material and a carbon-based active material. For example, when the negative active material is formed of only the silicon-based active material, battery characteristics may not be sufficiently increased.

The battery characteristics may be improved by adding a S=O-containing compound to an electrolyte solution. The S=O-containing compound may have a structure that depends on a G band/D band ratio of the carbon-based active material, which will be described in detail below.

The silicon-based active material may include silicon (e.g., silicon atoms) and may be a material that electrochemically intercalates and deintercalates lithium ions. The silicon active material may include, e.g., a particulate of silicon elementary substance, a particulate of silicon oxide, an alloy including silicon as a basic material, or the like. The silicon oxide may be represented by $SiO_x$ ($0 \leq x \leq 2$). The alloy including silicon as a basic material may include silicon in a wt % of the total metal elements, based on a total weight of the alloy, e.g., a Si—Al—Fe alloy.

The carbon-based active material may include carbon (e.g., a material having carbon atoms), and may also be a material that electrochemically intercalates and deintercalates lithium ions. The carbon-based active material may include, e.g., a graphite active material (e.g., artificial graphite, natural graphite, a mixture of artificial graphite and natural graphite, natural graphite coated with artificial graphite, or the like), or the like.

The carbon-based active material may have an intrinsic G band/D band ratio or G band/D band ratio. For example, two peaks (G band and D band) are shown in the Raman spectrum of the carbon-based active material. The G band is a peak observed in a wave number range of about 1580±20 $cm^{-1}$, and the D band is a peak observed in a wave number range of about 1355±20 $cm^{-1}$. Then, the G band/D band ratio may be obtained by dividing an area of the G band by an area of the D band.

The area of each peak may be obtained by, e.g., mensuration by division. As the G band/D band ratio is higher, the carbon-based active material may have high reactivity (e.g., may more easily decompose the solvent of the rechargeable lithium ion battery).

Accordingly, the battery characteristics of the rechargeable lithium ion battery may be remarkably improved by including a S=O-containing compound (that has a different structure depending on a G band/D band ratio of the carbon-based active material) in an electrolyte solution, which will be described in detail below.

The silicon-based active material and the carbon-based active material of the negative active material may be included in a suitable weight ratio. For example, the negative active material may be silicon-rich, carbon-rich, or about even.

The negative active material may be included in the negative electrode active material in an amount of about 90 wt % to about 98 wt %, based on a total weight of the negative electrode active mass (the negative active material and the binder). When the negative active material is included within the range, battery characteristics may be particularly improved.

The binder may include the same as the binder of the positive active material layer 22. When the positive active material layer 22 is coated on a current collector 21, carboxylmethyl cellulose (hereinafter, CMC) as a thickener may be used in an amount of greater than or equal to about $\frac{1}{10}$ of the binder and less than and equal to the amount of the binder. The binder including the thickener may be used in an amount of about 1 wt % and less than or equal to about 10 wt %, based on the total weight of the negative electrode active mass. When the binder including the thickener is used within the range, battery characteristics may be particularly improved.

The negative active material layer 32 may have a suitable density (g/cm$^3$), e.g., about 1.0 to about 2.0. When the negative active material layer 32 has density within the range, battery characteristics may be particularly improved. The negative active material layer 32 may be formed by, e.g., dispersing the negative active material and the binder into a suitable solvent (e.g., N-methyl-2-pyrrolidone or water) to form a slurry, coating this slurry on the current collector 31, and drying it. The density of the negative active material layer 32 may be obtained by dividing planar density of the negative active material layer 32 by after the compression by thickness of the negative active material layer 32 after the compression.

A separator layer 40 may include a separator 40a and an electrolyte solution 43. The separator 40a may include a substrate 41 and a porous layer 42. The substrate 41 may be formed of a material selected from, e.g., polyethylene, polypropylene, or the like, and may include a plurality of first pores (e.g., minute pores) 41a.

The first pores 41a may have a spherical shape, as illustrated in FIG. 1, or may have various other suitable shapes. The first pores 41a may have a spherical diameter of, e.g., about 0.1 μm to about 0.5 μm. The spherical diameter of the first pores 41a may correspond to the diameter of a sphere, e.g., when the first pores 41a are regarded as the sphere. The first pores 41a may be measured by, e.g., an automatic porosimeter AutoporeIV (Shimadzu Corporation). This measuring device may be used to measure, e.g., a diameter distribution of the first pores 41a, and a diameter having the highest distribution may be regarded as a representative value.

The spherical diameter of the pores 41a in the surface layer of the substrate 41 may be measured by, e.g., a scanning electron microscope JSM-6060 (JEOL Ltd.). This measuring device measures, e.g., the diameter of each first pore 41a in the surface layer.

The substrate 41 may have porosity of, e.g., about 38-44%. When the substrate 41 has porosity within this range, cycle-life may be particularly improved. The porosity of the substrate 41 may be obtained by dividing the entire volume of the first pores 41a by the total volume of the substrate 41 (e.g., the total volume of the resin part and the first pores 41a of the substrate 41).

The porosity of the substrate 41 may be measured by, e.g., an automatic porosimeter AutoporeIV (Shimadzu Corporation). The substrate 41 may be about 6 μm to about 19 μm thick. When the substrate 41 has a thickness within the range, cycle-life may be particularly improved.

The porous layer 42 may be formed of a different material from the substrate 41, e.g., polyvinylidene fluoride, polyamideimide, aramid (aromatic polyamide) or the like, and may include a plurality of second pores (e.g., minute pores) 42a. In an implementation, the second pores 42a have a spherical shape as illustrated in FIG. 1, or may have various other suitable shapes.

The second pores 42a may be different from the first pores 41a, for example, the second pores 42a may have a larger diameter and porosity than the first pores 41a. In an implementation, the second pores 42a may have a diameter of, e.g., about 1 μm to about 2 μm.

The second pores 42a may have the diameter of a sphere when the second pore 42a is regarded as a sphere and is measured by, e.g., a scanning electron microscope JSM-6060 (Joel Ltd.). This measuring device may measure the diameter of each second pore 42a.

Polyvinylidene fluoride applied to the porous layer 42 may include, e.g., KF polymer #1700, #9200, #9300, or the like (KUREHA CORPORATION). The polyvinylidene fluoride may have a weight average molecular weight of, e.g., about 500,000-1,000,000. The porous layer 42 may be directly synthesized or commercially available.

The separator 40a may have porosity of, e.g., about 39% to about 58%. When the separator 40a has porosity within this range, cycle-life may be particularly improved. Herein, the porosity of the separator 40a may be obtained by dividing the total volume of the first pores 41a and second pores 42a by the total volume of the separator 40a (e.g., the total volume of the resin part and the first pores 41a of the substrate 41a and the resin part of the and the second pores 42a of the porous layer 42). The porosity of the separator 40a may be measured with, e.g., an automatic porosimeter AutoporeIV (Shimadzu Corporation). The porosity of the separator 40a may be larger than the porosity of the substrate 41, and the porosity of the porous layer 42, e.g., the porosity of the second pores 42a, may be higher than the porosity of the substrate 41, e.g., the porosity of the first pores 41a.

The porous layer 42 may be about 1 μm to about 5 μm thick. The thickness of the separator 40a, e.g., the sum of the thickness of the substrate 41 and the thickness of the porous layer 42 may be about 10 μm to 25 μm. When the porous layer 42 or the separator 40a has a thickness within these ranges, cycle-life may be particularly improved.

In an implementation, the porous layer 42 may be positioned on sides, e.g., both sides, of the substrate 41, e.g., on the side of the positive electrode 20 and the side of the negative electrode 30 in FIG. 1, but at least on the side of the negative electrode 30. In terms of cycle-life improvement of a rechargeable lithium ion battery, the porous layer 42 may be formed on both sides of the substrate 41.

The substrate 41 may have suitable air permeability (e.g., air permeability defined as JIS P8117), about 250 sec/100 cc to about 300 sec/100 cc. In an implementation, the substrate 40a may have an air permeability of, e.g., about 220 sec/100 cc to about 340 sec/100 cc. When the substrate 41 and the separator 40a have air permeability within the ranges, cycle-life may be particularly improved. The air permeability of the substrate 41 and the separator 40*a* is measured with, e.g., a Gurley-type air permeability meter G-B2 (TOYOSEIKI CO., LTD).

The separator 40*a* may be formed by, e.g., coating a coating solution (including a resin and a water-soluble organic solvent) on the substrate 41 to form the porous layer 42 and then, coagulating the resin and removing the water-soluble organic solvent. In this way, the separator 40*a* may have a multi-layer structure of the substrate 41 and the porous layer 42 but a single structure (for example, a structure of only the substrate 41).

The electrolyte solution 43 may include a lithium salt, a solvent, and an additive. The additive may include the S=O-containing compound. The lithium salt may be an electrolyte of the electrolyte solution 43. The lithium salt may include, e.g., $LiClO_4$, $LiBF_4$, $LiAsF_6$, $LiSbF_6$, $LiSO_3CF_3$, $LiN(SO_2CF_3)$, $LiN(SO_2CF_2CF_3)$, $LiC(SO_2CF_2CF_3)_3$, $LiC(SO_2CF_3)_3$, LiI, LiCl, LiF, $LiPF_5(SO_2CF_3)$, $LiPF_4(SO_2CF_3)_2$, or the like, as well as lithium hexafluoro phosphate ($LiPF_6$). In an implementation, the lithium salt may include, e.g., $LiPF_6$, $LiClO_4$, $LiBF_4$, $LiAsF_6$, or $LiSbF_6$. When these lithium salts are dissolved in the electrolyte solution 43, battery characteristics may be particularly improved.

In the electrolyte solution 43, any one lithium salt or more than one lithium salt may be dissolved therein among the above lithium salts.

The lithium salt may be dissolved in a concentration of about 1.15 mol/L to about 1.5 mol/L (e.g., the concentration sum of the lithium salts when more than one lithium salt is dissolved in the electrolyte solution 43). In an implementation, the concentration may be, e.g., about 1.3 mol/L to about 1.45 mol/L. When the lithium salt is included with the concentration range, battery characteristics may be particularly improved.

The solvent may include various kinds of suitable non-aqueous solvent for a rechargeable lithium ion battery. The solvent may include, e.g., at least one of hydrofluoroether (HFE), linear carbonate ester, or fluoro ethylene carbonate.

The hydrofluoroether is an ether where a part of hydrogen is substituted with a fluorine, and may have improved oxidation resistance. Considering resistance for a charge voltage and current density of a positive electrode material, the hydrofluoroether may include, e.g., 2,2,2-trifluoroethylmethylether ($CF_3CH_2OCH_3$), 2,2,2-trifluoroethyl difluoromethyl ether ($CF_3CH_2OCHF_2$), 2,2,3,3,3-pentafluoropropylmethylether ($CF_3CF_2CH_2OCH_3$), 2,2,3,3,3-pentafluoropropyldifluoromethyl ether ($CF_3CF_2CH_2OCHF_2$), 2,2,3,3,3-penta fluoropropyl-1,1,2,2-tetrafluoroethyl ether ($CF_3CF_2CH_2OCF_2CF_2H$), 1,1,2,2-tetrafluoro ethylmethylether ($HCF_2CF_2OCH_3$), 1,1,2,2-tetrafluoro ethylethylether ($HCF_2CF_2OCH_2CH_3$), 1,1,2,2-tetrafluoro ethylpropylether ($HCF_2CF_2OC_3H_7$), 1,1,2,2-tetrafluoro ethylbutylether ($HCF_2CF_2OC_4H_9$), 1,1,2,2-tetrafluoro ethylisobutylether ($HCF_2CF_2OCH_2CH(CH_3)_2$), 1,1,2,2-tetrafluoro ethylisopentylether ($HCF_2CF_2OCH_2C(CH_3)_3$), 1,1,2,2-tetrafluoroethyl-2,2,2-trifluoro ethylether ($HCF_2CF_2OCH_2CF_3$), 1,1,2,2-tetrafluoroethyl-2,2,3,3-tetrafluoro propylether ($HCF_2CF_2OCH_2CF_2CF_2H$), hexafluoro isopropylmethylether (($CF_3)_2CHOCH_3$), 1,1,3,3,3-pentafluoro-2-trifluoro methylpropylmethylether (($CF_3)_2CHCF_2OCH_3$), 1,1,2,3,3,3-hexafluoro propylmethylether ($CF_3CHFCF_2OCH_3$), 1,1,2,3,3,3-hexafluoro propylethylether ($CF_3CHFCF_2OCH_2CH_3$) or 2,2,3,4,4,4-hexafluoro butyldifluoromethylether ($CF_3CHFCF_2CH_2OCHF_2$). The hydrofluoroether may include one of these materials or a mixture of these materials. The hydrofluoroether may be included in the electrolyte solution in an amount of about 10 volume % to about 60 volume %, e.g., about 30 volume % to about 50 volume %, based on a total volume of the solvent of the electrolyte solution 43. When the hydrofluoroether is included within the described volume ratio, battery characteristics may be particularly improved.

The linear carbonate ester may be a carbonate ester having a linear structure. The linear carbonate ester may include, e.g., dimethyl carbonate, ethyl methyl carbonate, or diethyl carbonate. In an implementation, the electrolyte solution 43 may include one kind of the linear carbonate ester. The linear carbonate ester may be included in the electrolyte solution in an amount of about 5 volume % to 60 volume %, e.g., about 20 volume % to about 50 volume %, based on the total volume of the electrolyte solution 43. When the linear carbonate ester is included within the volume ratio, battery characteristics may be particularly improved.

The fluoro ethylene carbonate may be included in the electrolyte solution in an amount of about 10 volume % to about 30 volume %, e.g., about 15 volume % to about 20 volume %, based on the total volume of the electrolyte solution 43. When the fluoro ethylene carbonate, e.g., mono fluoro ethylene carbonate, is included in this amount, cycle-life may be particularly improved. In an implementation, the electrolyte solution 43 may additionally include suitable non-aqueous solvents used in a rechargeable lithium ion battery.

According to one embodiment, the S=O-containing compound is a compound including an S=O structure or moiety. The S=O-containing compound may have a different structure, depending on the G band/D band ratio of a carbon-based active material. In an implementation, a rechargeable lithium ion battery may be manufactured by using a lithium foil as a positive active material, a mixture of a silicon-based active material and a carbon-based active material as a negative active material, and ethylene carbonate as a solvent. After the rechargeable lithium ion battery is charged and discharged more than once, a correlation between behavior of the rechargeable lithium ion battery and, e.g., potential (based on $Li/Li^+$), of the negative active material, and dQ/dV may be examined. As a result, when the negative active material has a potential of about 0.4 V during the charge of the rechargeable lithium ion battery, the dQ/dV may become disordered. In an implementation, the potential of the negative active material may be changed in a range of about 0.5 V to 10 mV after the 2nd charge and discharge.

As a result, the solvent (e.g., ethylene carbonate) may be decomposed in or at the negative active material during every charge, e.g., at least during the charge. The reason for insufficient battery characteristics may be that a decomposition product of the solvent may be deposited on the negative active material and may hinder lithium ions from getting in and out of the negative active material. Accordingly, an additive that satisfies the following three conditions may be added to the electrolyte solution.

The additive may be decomposed earlier than the solvent during the charge (e.g., at a higher potential than that of the solvent).

A product generated during the decomposition may help suppress the decomposition of the solvent. For example, the decomposition product of the additive may cover the negative active material and may help prevent contact between the solvent and the negative active material.

The decomposition product may not, or only to a small degree, hinder lithium ions from getting in and out of the negative active material.

An additive satisfying the above conditions is described below.

The following experiment was performed based on an S=O-containing compound (a compound including at least one S=O bond). For example, a rechargeable lithium ion battery was manufactured by using a lithium foil as a positive active material, a mixture of a silicon-based active material and a carbon-based active material as a negative active material, and ethylene carbonate as a solvent (e.g., for an electrolyte solution). In addition, the S=O-containing compound was added to an electrolyte solution. Then, the rechargeable lithium ion battery was charged and discharged more than once, and then, a correlation between behavior of the rechargeable lithium ion battery, e.g., potential of the negative active material (based on Li/Li$^+$), and dQ/dV was examined.

As a result, when the rechargeable lithium ion battery had a potential of higher than about 0.4V during the charge, the dQ/dV became disordered, and when the rechargeable lithium ion battery had a potential of about 0.4V, the dQ/dV was almost not disordered. In addition, battery characteristics of the rechargeable lithium ion battery were clearly improved (see the below-described Examples).

Accordingly, the S=O-containing compound may be decomposed earlier than the solvent, and its decomposition product may help suppress decomposition of the solvent and may not hinder lithium ions from getting in and out of the negative active material. For example, the S=O-containing compound may satisfy the above three conditions.

In an implementation, a kind of the carbon-based active material may vary as described above. The carbon-based active materials may be selected depending on energy density or desired usage of the rechargeable lithium ion battery. Accordingly, the rechargeable lithium ion battery 10 according to an embodiment may correspond to or include various carbon-based active materials in order to be put into use.

The carbon-based active material may have a larger specific surface area than the silicon-based active material, and the carbon-based active material may significantly decompose the solvent (or the S=O-containing compound), e.g., to a greater degree, compared with the silicon-based active material. Accordingly, the S=O-containing compound may endure consumption (e.g., decomposition) on the carbon-based active material and may help suppress decomposition of the solvent.

Accordingly, an S=O-containing compound according to an embodiment may be capable of improving battery characteristics despite use of any carbon-based active material as a negative active material. For example, the carbon-based active material could massively dissolve the solvent (or the S=O-containing compound), and a correlation between a G band/D band ratio of the carbon-based active material and the S=O-containing compound based on the G band/D band ratio may be a parameter showing reactivity of the carbon-based active material.

As a result, the desirability of various S=O-containing compounds was found out to vary depending on the G band/D band ratio of the carbon-based active material. For example, the S=O-containing compound may be classified into 4 upper limits (e.g., groups or divisions) based on the G band/D band ratio of the carbon-based active material, as shown in the following Table 1.

TABLE 1

| G/D ratio | S=O Compound Effective | | | |
|---|---|---|---|---|
| Gr >2 | [—S=O(=O)] $R_1\text{-}S(\text{=}O)(\text{=}O)\text{-}R_1'$ | [—OS=O(=O)] | [—O(O)S=O] $R_3\text{-}O\text{-}S(\text{=}O)\text{-}O\text{-}R_3'$ | [—O(O)S=O(=O)] $R_4\text{-}O\text{-}S(\text{=}O)(\text{=}O)\text{-}O\text{-}R_4'$ |
| ≤2 | [—S=O(=O)] $R_5\text{-}S(\text{=}O)(\text{=}O)\text{-}R_5'$ | [—OS=O(=O)] (cyclic $R_2$ sulfonate) | [—O(O)S=O] | [—O(O)S=O(=O)] |

| G/D ratio | S=O Compound Non effective | | | |
|---|---|---|---|---|
| Gr >2 | [—S=O(=O)] (cyclic sulfone) | [—OS=O(=O)] | [—O(O)S=O] | [—O(O)S=O(=O)] |

TABLE 1-continued

| ≤2 | [—S=O(=O)] | [—OS=O(=O)] | [—O(O)S=O] | [—O(O)S=O(=O)] |
|---|---|---|---|---|
| | 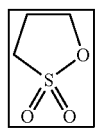 | | | |

Herein, in Table 1, "Gr" refers to a carbon-based active material.

In addition, "effective" refers to improvement of battery characteristics, compared with a rechargeable lithium ion battery using an electrolyte solution without a S=O-containing compound, and "non effective" refers to equivalent or lower battery characteristics than the rechargeable lithium ion battery using an electrolyte solution without a S=O-containing compound.

A structure formula in the bracket indicates an S=O bond.

In addition, the first upper limit or division corresponds to a G band/D band ratio>2 and simultaneously, to "effective", and the second upper limit or division corresponds to the G band/D band ratio≤2 and simultaneously, to "effective". The third upper limit or division corresponds to the G band/D band ratio>2 and simultaneously, to "non effective", and the fourth upper limit or division corresponds to the G band/D band ratio≤2 and simultaneously, to "non effective."

The S=O-containing compound of the first division may be represented by one of the following Chemical Formulae 1 to 3.

[Chemical Formula 1]
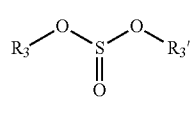

[Chemical Formula 2]

[Chemical Formula 3]
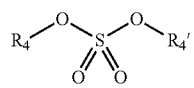

Herein, $R_1$ and $R_1'$ may each independently be a C1 or C2 hydrocarbon group, and at least one part of hydrogen atoms of $R_1$ and $R_1'$ may be substituted. $R_3$ and $R_3'$ may each independently be a C1 or C2 hydrocarbon group, may be linked to each other, or at least one part of hydrogen atoms of $R_3$ and $R_3'$ may be substituted. $R_4$ and $R_4'$ may each independently be a C1 or C2 hydrocarbon group, or at least one part of hydrogen atoms of $R_4$ and $R_4'$ may be substituted.

The S=O-containing compound represented by Chemical Formula 1 may be, e.g., ethylmethylsulfone (EMS), diethyl sulfone (DES), or the like. The S=O-containing compound represented by Chemical Formula 2 may be, e.g., dimethyl sulfurous acid (DMSI), diethyl sulfurous acid (DESI), ethylene sulfurous acid (ES), or the like. The S=O-containing compound represented by Chemical Formula 3 may be, e.g., dimethyl sulfuric acid (DMSA), diethyl sulfuric acid (DESA), or the like.

The S=O-containing compound of the second division may be represented by one of the following Chemical Formulae 4 and 5.

[Chemical Formula 4]
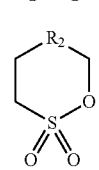

[Chemical Formula 5]
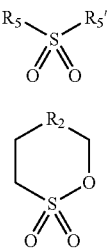

Herein, one of $R_5$ and $R_5'$ may be a hydrocarbon group having a carbon number of 3 or more, another may be a C1 or C2 hydrocarbon group, and at least one part of hydrogen atoms of $R_5$ and $R_5'$ may be substituted. $R_2$ may be a hydrocarbon group having a carbon number of 1 or more, and at least one part of hydrogen atoms of $R_2$ may be substituted.

The S=O-containing compound represented by Chemical Formula 4 may be, e.g., ethylisopropylsulfone (EiPS), ethylbutylsulfone (EBS) and butylisopropylsulfone (BiPS), or the like. The S=O-containing compound represented by Chemical Formula 5 may be, e.g., butane sultone (BS), or the like.

The S=O-containing compound of the third division may be, e.g. sulfolane (SL), and the S=O-containing compound of the fourth upper limit may be, e.g. propanesultone (PS).

Accordingly, in the present exemplary embodiment, the electrolyte solution 43 may include at least one S=O-containing compound of the first division when the carbon-based active material has a G band/D band ratio of greater than about 2.

In an implementation, when the carbon-based active material has a G band/D band ratio of less than or equal to about 2, the electrolyte solution 43 may include at least one S=O-containing compound of the second division.

The S=O-containing compound may be included in the electrolyte in an amount of about 0.5 volume % to about 5.0 volume %, e.g., about 3.0 volume % to about 5.0 volume % or about 3.0 volume %, based on a total volume of the solvent.

Maintaining the amount of the S=O-containing compound at about 0.5 volume % or greater may help ensure that the S=O-containing compound has sufficient effects. Maintaining the amount of the S=O-containing compound at about 5 volume % or less may help prevent an undesirably excessive increase in viscosity of the electrolyte solution. Thus electrolyte solution may be sufficiently soaked in each active material, and deterioration in ion conductivity of the electrolyte solution and discharge capacity may be reduced and/or prevented.

In an implementation, various additives may be added to the electrolyte solution 43. The additives may include, e.g., an additive for a cathodic behavior, an additive for an anodic behavior, an ester-based additive, a carbonate ester-based additive, a sulfate ester-based additive, a phosphate ester-based additive, a borate ester-based additive, an acid anhydride-based additive, an electrolyte-based additive, or the like.

One of these additives may be added to the electrolyte solution 43 alone, or a mixture of more than one thereof may be added thereto. The additives may be added in an amount of, e.g., 0.01 wt % to about 5.0 wt % based on the total weight of an electrolyte and a solvent (including the S=O-containing compound) of the electrolyte solution 43. When the additives are added within this range, battery characteristics may be particularly improved.

For example, the electrolyte solution 42 may include a first additive represented by the following Chemical Formula 1a or 1b.

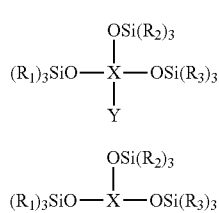

[Chemical Formula 1a]

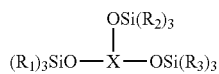

[Chemical Formula 1b]

In the above Chemical Formulae 1a and 1b,
X may be an element selected from a Group 13 element, a Group 14 element, and a Group 15 element,
Y may be a Group 16 element, and
$R_1$ to $R_3$ may be independently a substituted or unsubstituted C1 to C4 alkyl group.

In an implementation, the electrolyte solution 43 may include one kind or more than one kind of the first additive.

In the above Chemical Formulae 1a and 1b, X may be one kind of element selected from the group consisting of a Group 13 element, a Group 14 element and a Group 15 element, e.g., boron or phosphorus.

Y may be a Group 16 element, e.g., oxygen. $R_1$ to $R_3$ may be each independently a substituted or unsubstituted C1 to C4 alkyl group. Examples of the first additive may include compounds represented by the following Chemical Formulae 1-1 to 1-3.

Hereinafter, an additive having a structure represented by Chemical Formula 1-1 is referred to be an additive 1-1, an additive having a structure represented by Chemical Formula 1-2 is referred to be an additive 1-2, and an additive having a structure represented by Chemical Formula 1-3 is referred to be an additive 1-3.

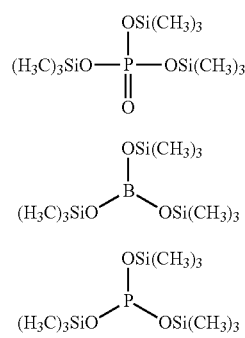

[Chemical Formula 1-1]

[Chemical Formula 1-2]

[Chemical Formula 1-3]

In an implementation, electrolyte solution 43 may include a second additive represented by the following Chemical Formula 2a.

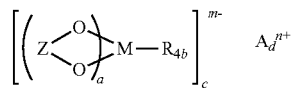

[Chemical Formula 2a]

In the above Chemical Formula 2a,
A may be an element selected from a Group 1A element, a Group 2A element, and aluminum, in a short form of the Periodic Table,
M may be element selected from a transition metal, a Group 3B element, a Group 4B element, and a Group 5B element in a short form of the Periodic Table,
$R_4$ may be a halogen element,
Z may be $-OC-R_{51}-CO-$, $-OC-C(R_{52})_2-$, or $-OC-CO-$, in which $R_{51}$ may be an alkylene group, a halogenated alkylene group, an arylene group, or a halogenated arylene group, and each $R_{52}$ may independently be an alkyl group, a halogenated alkyl group, an aryl group, or a halogenated aryl group,
a may be an integer of 1 to 4,
b may be 0, 2, or 4, and
c, d, m, and n may each independently be integers of 1 to 3.

In an implementation, the electrolyte solution 43 may include one kind or more than one kind of the second additive.

In the above Chemical Formula 2a, A may be one kind of element selected from a Group 1A element, a Group 2A element, and aluminum in a short form of the Periodic Table. M may be one kind element selected from transition metal, a Group 3B element, a Group 4B element, a Group 5B element in a short form of the Periodic Table, e.g., boron or phosphorus.

$R_4$ may be a halogen, Z may be $-OC-R_{51}-CO-$, $-OC-C(R_{52})_2-$, or $-OC-CO-$, in which $R_{51}$ may be an alkylene group, a halogenated alkylene group, an arylene group, or a halogenated arylene group, and each $R_{52}$ may independently be an alkyl group, a halogenated alkyl group, an aryl group, or a halogenated aryl group,
a may be an integer of 1 to 4, b may be 0, 2, or 4, and c, d, m, and n may each independently be integers of 1 to 3. Examples of the second additive may include, e.g., compounds represented by the following Chemical Formulae 2-1 to 2-5. Hereinafter, an additive having a structure represented by Chemical Formula 2-1 is referred to be an additive 2-1, an additive having a structure represented by Chemical Formula 2-2 is referred to be an additive 2-2, and an additive having a structure represented by Chemical Formula 2-3 is referred to be an additive 2-3. In addition, an additive having a structure represented by Chemical Formula 2-4 is referred to be an additive 2-4, and an additive having a structure represented by Chemical Formula 2-5 is referred to be an additive 2-5.

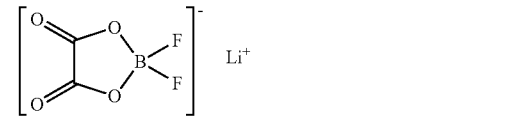

[Chemical Formula 2-1]

-continued

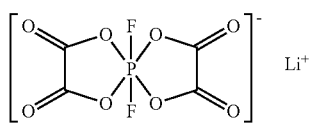
[Chemical Formula 2-2]

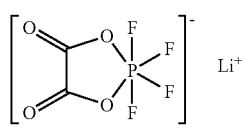
[Chemical Formula 2-3]

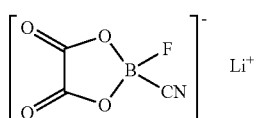
[Chemical Formula 2-4]

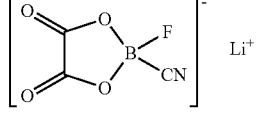
[Chemical Formula 2-5]

In an implementation, the electrolyte solution may include the first additive represented by the above Chemical Formula 1a or 1b, and the second additive represented by the above Chemical Formula 2a.

An electrolyte solution was manufactured by mixing fluoro ethylene carbonate (FEC), dimethyl carbonate (DMC), and HFE (herein, $H(CF_2)_2OCH_2(CF_2)_2H$) in a volume ratio of 15:45:40 to prepare a solvent, and dissolving lithium hexafluoro phosphate in a concentration of 1.3 mol/L therein. Then, a lithium foil was used as a positive active material, and a silicon-based active material or a carbon-based active material was used as the negative active material, and the electrolyte solution was used to manufacture a rechargeable lithium ion battery cell for a test.

Figure 2:
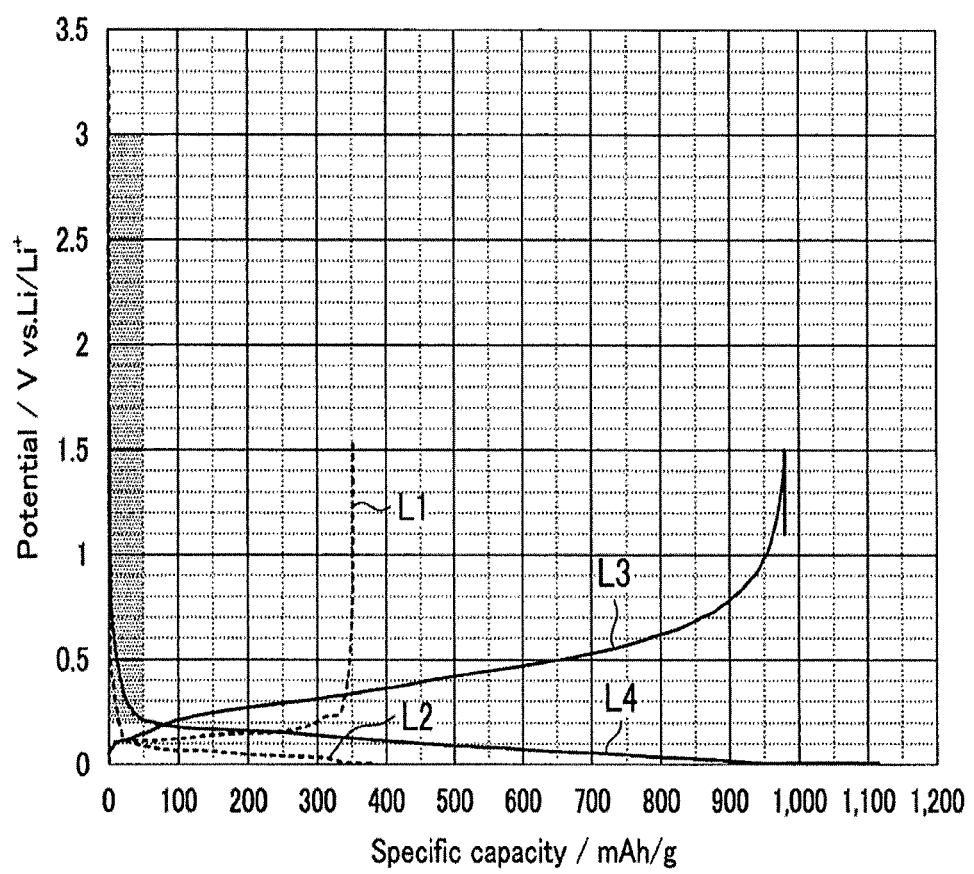
FIG. 2 illustrates a graph showing a correspondence relation between specific capacity of the rechargeable lithium ion battery and potential of a negative active material.

The rechargeable lithium ion battery cell was charged and discharged once according to a charge and discharge curved line shown in FIG. 2. A graph (L1) is a curved line, e.g., a discharge curved line showing a correlation between a potential of the carbon-based active material (based on Li/Li+, hereinafter, the same) and discharge capacity of the rechargeable lithium ion battery cell during the discharge. A graph (L2) is a curved line, e.g., a charge curved line showing potential of the carbon-based active material and discharge capacity of the rechargeable lithium ion battery cell during the charge. A graph (L3) is a discharge curved line of the silicon-based active material, and a graph (L4) is a charge curved line of the silicon-based active material.

Figure 3:
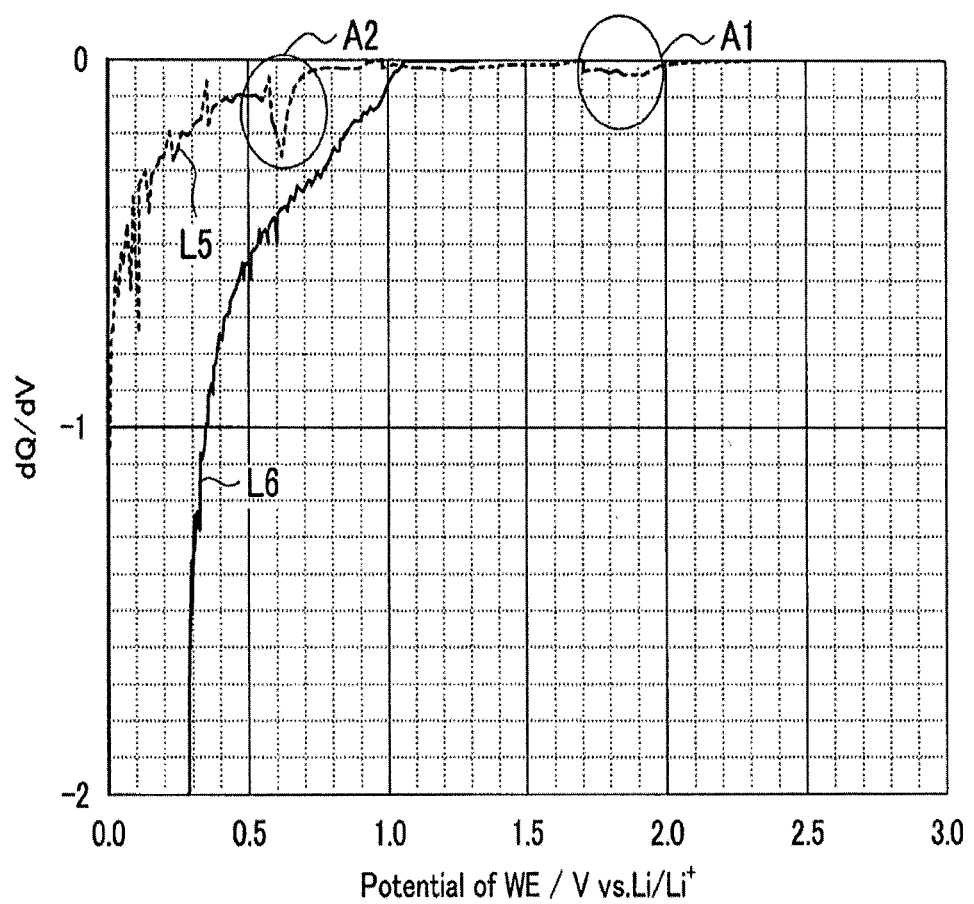
FIG. 3 illustrates a graph showing a correspondence relation between the potential of the negative active material and dQ/dV.

Then, a correlation between behavior of each rechargeable lithium ion battery cell during the charge, e.g., potential of the negative active material and dQ/dV (quantity of electricity relative to a potential change) was examined. The results are provided in FIG. 3. A graph (L5) shows a correlation between potential of the carbon-based active material and the dQ/dV, and a graph (L6) shows a correlation between a potential of the silicon-based active material and the dQ/dV.

The graph showing a correlation between potential of the negative active material and the dQ/dV shows disorder (peak) when the solvent was decomposed. In addition, the solvent was less decomposed, as the dQ/dV was less changed, until the rechargeable lithium ion battery was full-charged.

As shown in the graph (L5), when the carbon-based active material was used as a negative active material, the negative active material showed a peak (disordered) (A1) in the dQ/dV at a potential of about 1.7 V to about 2.0 V and another peak (A2) in the dQ/dV at 0.6 V. The peak (A1) was caused by decomposition of HFE, and the peak (A2) was caused by decomposition of FEC. On the other hand, when silicon-based active material was used as a negative active material, the dQ/dV was deteriorated down to a potential of less than or equal to about 1.05 V.

As a result, when the carbon-based active material was used as a negative active material, the HFE was first decomposed on the negative active material, and then, the FEC was decomposed as the rechargeable lithium ion battery cell charged. In addition, the HFE was decomposed but did not form a valid passivation film on the carbon-based active material (e.g., did not suppress decomposition of the solvent). Furthermore, when the silicon-based active material was used as a negative active material, all the solvent was decomposed at a potential of less than or equal to about 1.05 V as the rechargeable lithium ion battery cell charged.

In addition, when each rechargeable lithium ion battery cell was charged and discharged more than once, the potential of the negative active material was changed between about 0.5 V and 10 mV from the $2^{nd}$ cycle during the charge and discharge.

As a result, the solvent was decomposed on the negative active material at least during the charge, e.g., FEC was decomposed during every charge. In addition, a decomposition product of the solvent was deposited on the negative active material and hindered lithium ions from getting in and out of the negative active material and resultantly, caused insufficient battery characteristics.

Accordingly, an additive satisfying the following three conditions was added to the electrolyte solution.

The additive may be decomposed earlier than the solvent during the charge (e.g., at a higher potential of the solvent).

A product from the decomposition of the additive may help suppress decomposition of the solvent. For example, the decomposition product may cover the negative active material and may help prevent the solvent from contacting with the negative active material.

The decomposition product may not or may not significantly hinder lithium ions from getting in and out of the negative active material.

The additive satisfying the above condition was thoroughly examined. As a result, the following experiment by using first and second additives was performed. For example, a rechargeable lithium ion battery cell without the additives, a rechargeable lithium ion battery cell including an additive 1-1, a rechargeable lithium ion battery cell including an additive 2-2, and a rechargeable lithium ion battery cell including both of the additives 1-1 and 2-2 were manufactured and experimented as described above. The results are provided in FIGS. 4 and 5.

Figure 4:
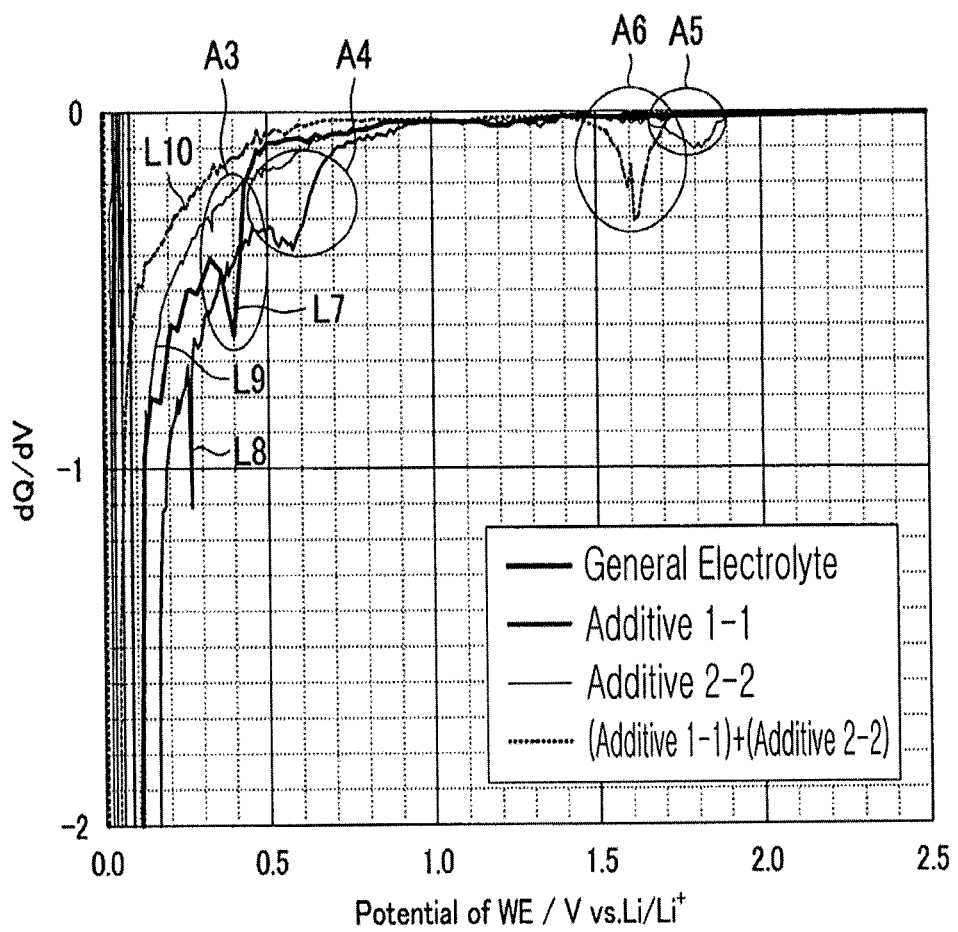
FIG. 4 illustrates a graph showing a correspondence relation between the potential of the negative active material and dQ/dV.
Figure 5:
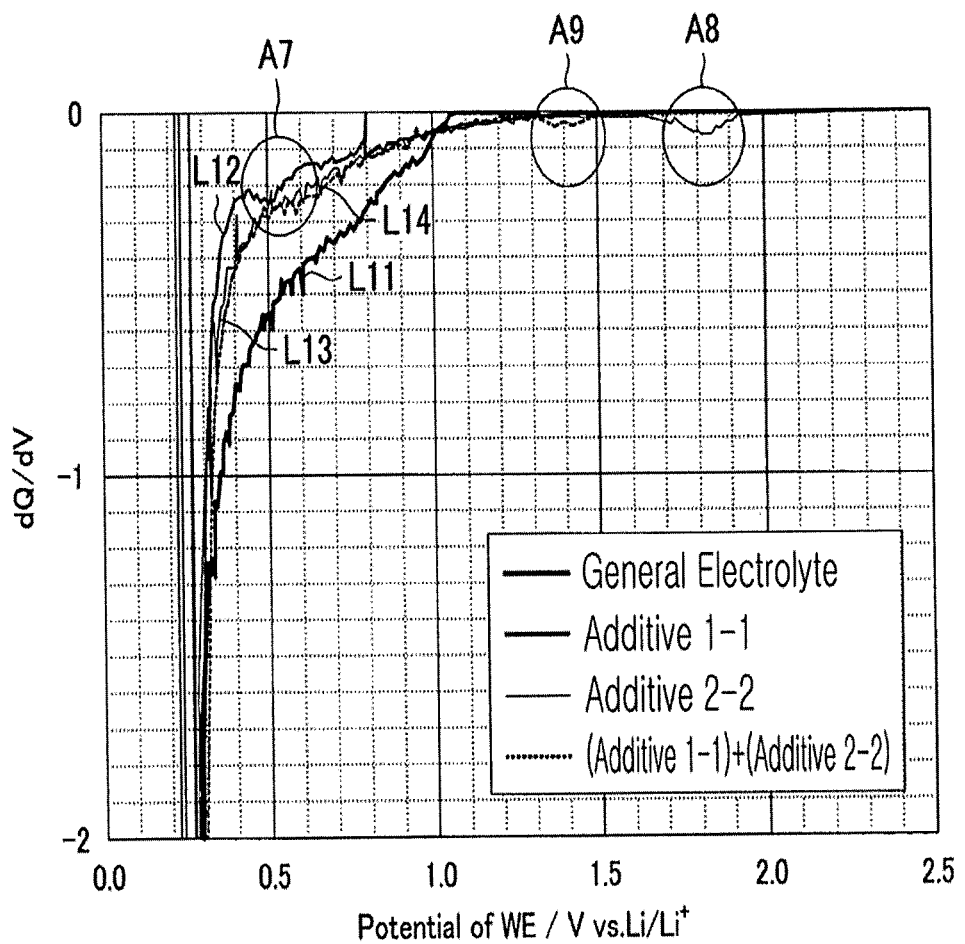
FIG. 5 illustrates a graph showing a correspondence relation between the potential of the negative active material and dQ/dV.

FIG. 4 shows a correlation showing a potential of a carbon-based active material and dQ/dV. Specifically, a graph (L7) shows a correlation showing potential of the carbon-based active material and dQ/dV when the additive is not added to an electrolyte solution. The graph (L7) corresponds to the above graph (L5) and has a peak (A3). The peak (A3) corresponds to decomposition of FEC. On the other hand, the graph (L7) shows almost no peak corresponding to decomposition of FIFE, but the HFE is regarded to be decomposed as described above.

The graph (L8) shows a correlation between potential of a carbon-based active material and dQ/dV when the additive 1-1 was added to the electrolyte solution. The graph (L9) shows a correlation between potential of the carbon-based active material and the dQ/dV when the additive 2-2 was added to the electrolyte solution. The graph (L10) shows a correlation between potential of the carbon-based active material and the dQ/dV when the additives 2-1 and 2-2 were added to the electrolyte solution.

The graph (L8) shows a peak (A4) at a higher potential than the peak (A3). This peak A4 was possibly caused by decomposition of the additive 1-1. In addition, a peak corresponding to decomposition of the HFE and FEC was almost not observed. Furthermore, as shown in the following Examples, cycle-life was improved when the additive 1-1 was added to the electrolyte solution.

The graph (L9) shows a peak (A3) and a peak (A5) at a higher potential than the peak (A4). The peak (A5) may be caused by decomposition of the additive 2-2. In addition, a peak corresponding to decomposition of the HFE and FEC was almost not observed. Furthermore, as shown in the following Examples, cycle-life was improved when the additive 2-1 similar to the additive 2-2 was added to the electrolyte solution.

The graph (L10) has a peak (A5) at a higher potential than the peak (A3). This peak (A5) may be caused by decomposition of the additives 1-1 and 2-2. In addition, a peak corresponding to decomposition of the FIFE and FEC was almost not observed. Furthermore, the dQ/dV was less changed than the graphs L7-L10 over all the potential of the negative active material. In addition, as shown in the following Examples, when the additives 1-1 and 2-2 were added to the electrolyte solution, cycle-life was improved.

Figure 6:
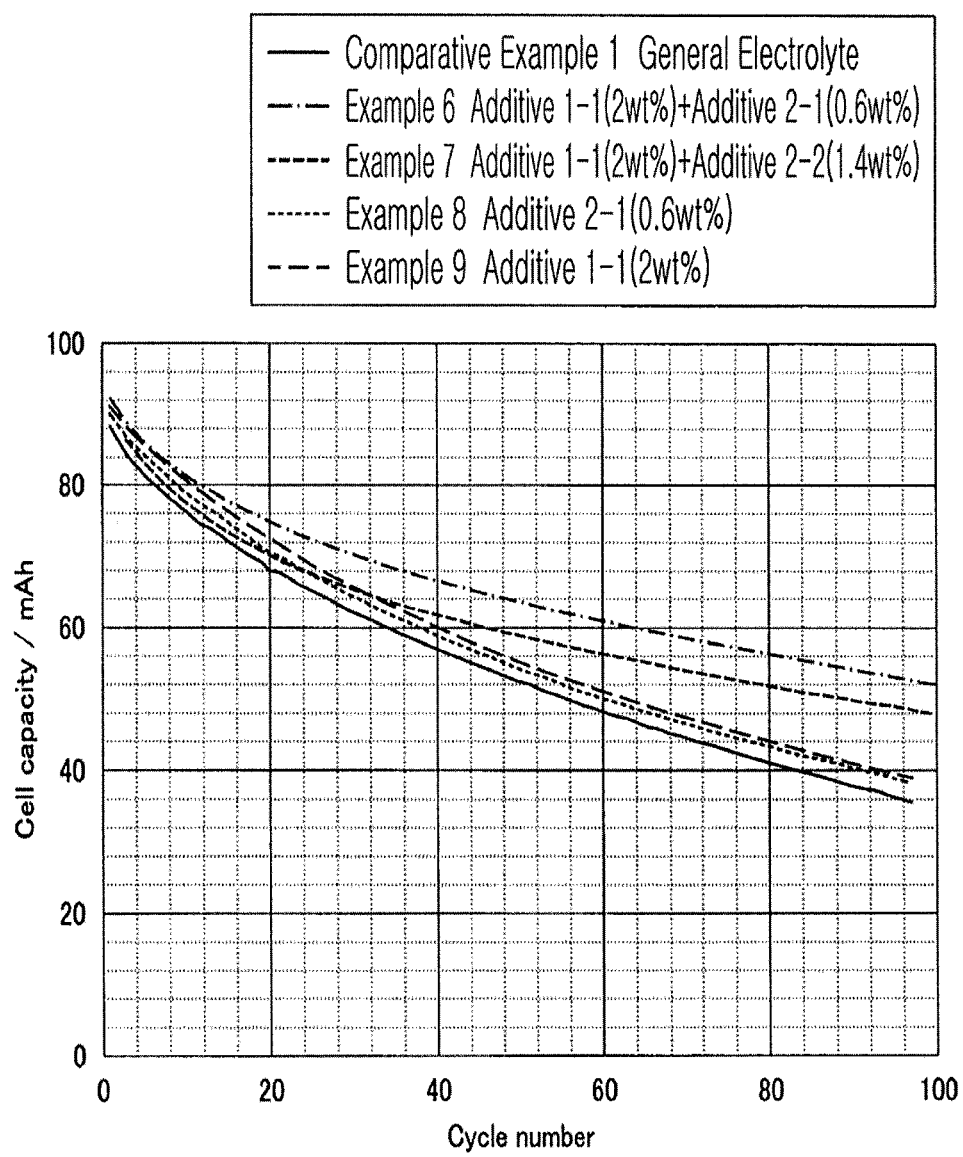
FIG. 6 illustrates a graph showing a correspondence relation between the number of cycles of the rechargeable lithium ion battery and its discharge capacity.

FIG. 6 shows a correlation between potential of the silicon-based active material and dQ/dV. Specifically, a graph (L11) shows a correlation when the additive was not added to the electrolyte solution. The graph (L11) corresponds to the above graph (L6).

A graph (L12) shows a correlation when the additive 1-1 was added to the electrolyte solution. A graph (L13) shows a correlation when the additive 2-2 was added to the electrolyte solution. A graph (L14) shows a correlation when the additives 1-1 and 2-2 were added to the electrolyte solution.

The graph (L12) has a peak (A7). This peak (A7) may be caused by decomposition of the additive 1-1. In addition, a peak corresponding to decomposition of HFE and FEC was almost not observed. Furthermore, the dQ/dV in the graph (L12) was less changed than the graph (L11) over almost all potential of the negative active material. In addition, as shown in the following Examples, cycle-life was improved when the additive 1-1 was added to the electrolyte solution.

The graph (L13) has a peak (A8) at a higher potential than the peak (A7). This peak (A8) may be caused by decomposition of the additive 2-2. In addition, a peak corresponding to decomposition of the FIFE and FEC was almost not observed. Furthermore, the dQ/dV was less changed than graph (L11) almost all over the potential of the negative active material. In addition, as shown in the following Examples, cycle-life was improved when the additive 2-1 (similar to the additive 2-2) was added to the electrolyte solution.

A graph (L14) has a peak (A9) at a higher potential than the peak (A7). This peak (A9) may be caused by decomposition of the additives 1-1 and 2-2. In addition, a peak corresponding to decomposition of the HFE and FEC was not almost observed. Furthermore, the dQ/dV was less changed than the graph (L11) almost all over the potential of the negative active material. As shown in the following Examples, cycle-life was improved when the additives 1-1 and 2-2 were added to the electrolyte solution.

Based on the above experimental results, the first and second additives were earlier decomposed than the solvent, and a product from the decomposition covered the negative active material and thus, suppressed decomposition of the solvent and simultaneously, did not or only slightly hindered lithium ions from getting in and out of the negative active material. For example, these first and second additives all satisfied the above three conditions.

In addition, when first and second additives were added to the electrolyte solution, the cycle-life of the rechargeable lithium ion battery cell was remarkably improved. The reason may be that the second additive was earlier decomposed than the first additive, a product from the decomposition of the second additive covered most of the negative active material (e.g., most of the surface contacting with the electrolyte solution), and then, a product from the decomposition of the first additive filled the gap of the decomposition product of the second additive.

In addition, when the same experiment was performed by changing a kind of the negative active material, a rechargeable lithium ion battery cell using a mixture of the carbon-based active material and the silicon-based active material as the negative active material showed the most excellent cycle-life. For example, the mixture of the carbon-based active material and the silicon-based active material were the most compatible with the first and second additives. In addition, when the carbon-based active material had a G band/D band ratio of less than or equal to about 2, cycle-life was the most excellent.

On the other hand, the structure of the decomposition product of the second additive was estimated according to a molecular orbital computation. Hereinafter, the estimated structure of the decomposition product of the additive 2-1 is illustrated. First of all, the additive 2-1 may be reversibly changed by the following compound (I) or (II).

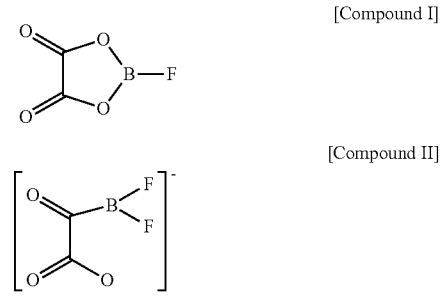

The following compound (IV) may be produced when the following compounds (III) and (I) derived from the solvent are bonded.

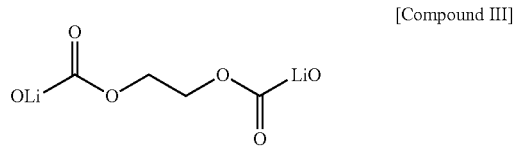

[Compound V]

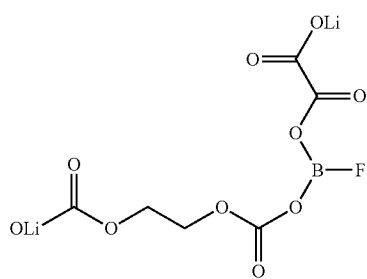

A compound (V), e.g., a product from the decomposition of the additive 2-1 may be produced when the compounds (IV) and (III) are bonded.

[Compound V]

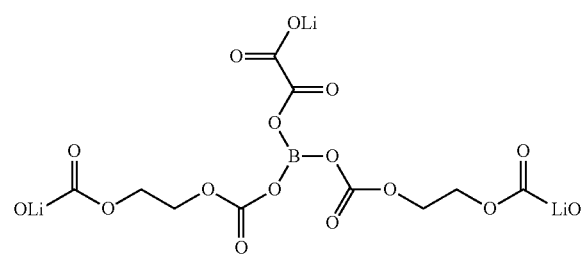

On the other hand, a compound produced by a bond of the first additive and the compound (I) other than the above compounds may cover the negative active material.

The first additive may be added in an amount of about 1 wt % to about 4 wt %, based on the total weight of the electrolyte solution. In an implementation, the second additive may be included in an amount of greater than or equal to about 0.25 wt %, based on the total weight of the electrolyte solution. The first and second additives may be included in an amount of less than or equal to about 5 wt %, based on the total weight of the electrolyte solution. Maintaining the amount of the first and second additives as described may help ensure that the first and second additives exhibit sufficient effects. Maintaining the amount of the first additive at about 4 wt % or less may help prevent an excessive increase in the viscosity of the electrolyte solution. Thus, ion conductivity of the electrolyte solution may be maintained, and the electrolyte solution may be sufficiently soaked in or permeate into each active material. For example, when the electrolyte solution is soaked in each active material layer, a large amount of vapor may be generated while the electrolyte solution is absorbed. Accordingly, discharge capacity may be deteriorated. In addition, when the first and second additives are included in an amount of about 5 wt %, the second additive may be eluted. In an implementation, the rechargeable lithium ion battery 10 may be used at a greater than or equal to about 20° C. of the electrolyte solution. When the electrolyte solution is at a temperature of less than about 20° C., the second additive may be eluted.

In an implementation, various additives, other than the first and second additives, may be added to the electrolyte solution 43. These additives may include, e.g., an additive for a negative electrode behavior, an additive for a positive electrode behavior, an ester-based additive, a carbonate ester-based additive, a sulfate ester-based additive, a phosphate ester-based additive, a borate ester-based additive, an acid anhydride-based additive, an electrolyte-based additive, or the like. In an implementation, one of these additives or a mixture of more than one thereof may be added to the electrolyte solution 43.

Method of Manufacturing Rechargeable Lithium Ion Battery

Hereinafter, a method of manufacturing the rechargeable lithium ion battery cell 10 is described.

A positive electrode 20 may be manufactured as follows.

First, a positive active material, a conductive agent, and a binder may be mixed in a desired ratio and then, dispersed into an organic solvent (e.g., N-methyl-2-pyrrolidone), forming a slurry. Subsequently, the slurry may be provided on a current collector 21 (e.g., coated) and dried, forming a positive active material layer 22.

On the other hand, the coating may have no particular limit.

The coating may be performed by using, e.g., a knife coater, a gravure coater, or the like. The following coating process may be performed in the same method. Subsequently, the positive active material layer 22 may be pressed to have density within a desired range by using a press. In this way, the positive electrode 20 may be manufactured.

A negative electrode 30 may be manufactured in the same method as the positive electrode 20.

First, a negative active material and a binder may be mixed in a desired ratio and dispersed into an organic solvent (e.g., N-methyl-2-pyrrolidone), forming a slurry. Subsequently, the slurry may be formed (e.g., coated) on a current collector 31 and dried, forming a negative active material layer 32. Subsequently, the negative active material layer 32 may be pressed to have density within a desired range by using a press. In this way, the negative electrode 30 is manufactured.

A separator 40a may be manufactured as follows.

First, a resin composing the porous layer 42 and a water-soluble organic solvent may be mixed in a weight ratio of about 5 to 10:90 to 95 to prepare a coating solution. The water-soluble organic solvent may include, e.g., N-methyl-2-pyrrolidone, dimethyl acetamido (DMAc), tripropylene glycol (TPG), or the like. Then, this coating solution may be formed (e.g., coated) to be about 1 μm to 5 μm thick on one side or both sides of the substrate 41. Subsequently, the coated substrate 41 may be treated with a coagulation solution to coagulate the resin in the coating solution.

The treatment with the coagulation solution may include, e.g., impregnation of the coated substrate 41 in the coagulation solution, pouring the coagulation solution on the coated substrate 41, or the like. In this way, the separator 40a may be manufactured. Herein, the coagulation solution may be obtained by mixing, e.g., the water-soluble organic solvent with water. An amount of the water may be about 40 volume % to about 80 volume %, based on the total volume of the coagulation solution. Subsequently, the separator 40a may be washed and dried to remove the water and the water-soluble organic solvent from the separator 40a.

Subsequently, the separator 40a may be interposed between the positive electrode 20 and the negative electrode 30, manufacturing an electrode structure. When the porous layer 42 is formed only on one side of the substrate 41, the negative electrode 30 may be positioned to face the porous layer 42. Subsequently, the electrode structure may be processed to have a desired shape (e.g., a cylinder, a prism, a laminate type, a button, or the like) and inserted into a container having the same shape.

Subsequently, an electrolyte solution having the composition may be injected into the container to impregnate the electrolyte solution into each pore in the separator 40a. The S=O-containing compound may be added to the electrolyte solution and may selectively belong to the first upper limit (when the carbon-based active material has a G band/D band ratio of greater than about 2) and to the second upper limit (when the carbon-based active material has a G band/D band ratio of less than or equal to about 2). In this way, the rechargeable lithium ion battery may be manufactured.

EXAMPLES

Hereinafter, more Examples are described. On the other hand, each parameter (for example, a spherical diameter) in the Examples was measured by the above device.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

[Manufacture of Rechargeable Lithium Ion Battery Cell]

The following Example 1 was performed in order to examine cycle-life improvement effects of an S=O-containing compound.

First, a rechargeable lithium ion battery cell 10 was manufactured as follows.

A positive electrode 20 was manufactured by dispersing 90 wt % of $Li_2CoO_2$, 6 wt % of KETJEN BLACK, and 4 wt % of polyvinylidene fluoride into N-methyl-2-pyrrolidone to form a slurry.

Subsequently, the slurry was coated on an aluminum thin film as a current collector 21 and dried to form a positive active material layer 22. The positive active material layer 22 was pressed with a press to have density of 2.3 g/cm$^3$. In this way, the positive electrode 20 was manufactured.

As for a negative electrode 30, 10.2 wt % of a silicon alloy (Si:Al:Fe=55:29:16 (a weight ratio)), 81.8 wt % of a carbon-based active material, and 8.0 wt % of a poly acrylic acid-based binder were dispersed into N-methyl-2-pyrrolidone to form a slurry. Subsequently, the slurry was coated on an aluminum thin film as a current collector 31 and dried to form a negative active material layer 32. The negative active material layer 32 was pressed to have density of 1.45 g/cm$^3$. In this way, the negative electrode 30 was manufactured.

In the negative electrode 30, the silicon-based active material and the carbon-based active material had a weight ratio of about 10/80.

As for a separator 40a, Aramid (poly[N,M-(1,3-phenylene)isophthalamide] made by Sigma-Aldrich, Inc. Japan) and a water-soluble organic solvent were mixed in a ratio of 5.5:94.5 wt % to prepare a coating solution.

Herein, the water-soluble organic solvent was prepared by mixing DMAc and TPG in a weight ratio of 50:50.

A porous polyethylene film (a thickness: 13 μm, porosity: 42%) was used as a substrate 41.

Then, the coating solution was coated to be 2 μm thick on both sides of the substrate 41. Subsequently, the coated substrate 41 was impregnated in a coagulation solution to coagulate the resin in the coating solution. In this way, the separator 40a was manufactured. Herein, the coagulation solution was prepared by mixing water, DMAc and TPG in a ratio of 50:25:25.

Subsequently, the separator 40a was washed and dried to remove the water and the water-soluble organic solvent. The separator 40a was interposed between the positive electrode 20 and the negative electrode 30, manufacturing an electrode structure. Subsequently, the electrode structure was inserted in a container for a test. An electrolyte solution was prepared by mixing ethylene carbonate (EC), an S=O-containing compound, ethyl methyl carbonate (EMC), and diethyl carbonate (DEC) in a volume ratio of 27:3:50:20, and dissolving lithium hexafluoro phosphate in a concentration of 1.3 mol/L in the mixed solvent. Subsequently, each pore in the separator 40a was impregnated with the electrolyte solution by injecting the electrolyte solution into the test container. In this way, the rechargeable lithium ion battery cell 10 for evaluation was manufactured. Herein, other rechargeable lithium ion battery cells 10 were manufactured by changing the combination of the carbon-based active material and the S=O-containing compound as shown in Table 2, below.

[Cycle Test]

Then, a cycle test was performed about each rechargeable lithium ion battery cell 10.

Specifically, a charge and discharge cycle was repeated 100 times by performing a constant current constant voltage charge at 3 mA/cm$^2$ until its cell voltage became 4.40 V and a constant current discharge until the cell voltage became 2.75 V. Then, discharge capacities at the first cycle and the 100th cycle were measured. The discharge capacity of any rechargeable lithium ion battery cells 10 at the first cycle was 200 mAh. The discharge capacity (mAh) at the 100$^{th}$ cycle is shown in the following Table 2.

The tests were all performed at 25° C. The discharge capacity was measured by using a device (TOYO SYSTEM Co., Ltd.). Table 2 shows a correspondence relation between the combination of the carbon-based active material and the S=O-containing compound and the discharge capacity at the 100th cycle.

TABLE 2

| | G band/D band ratio | Ref | EiPS | EBS | BS | DMSI | DMSA | ES | EMS | PS | SL |
|---|---|---|---|---|---|---|---|---|---|---|---|
| Carbon-based active material 1 | 1.4 | 154 | 190 | 172 | 170 | 142 | 152 | 140 | 134 | 150 | 13 |
| Carbon-based active material 2 | 2 | 150 | 176 | 168 | 162 | 138 | 140 | 128 | 146 | 152 | 4 |
| Carbon-based active material 3 | 2.3 | 135 | 122 | 111 | 135 | 146 | 143 | 148 | 156 | 130 | 88 |

TABLE 2-continued

| | G band/D band ratio | Ref | EiPS | EBS | BS | DMSI | DMSA | ES | EMS | PS | SL |
|---|---|---|---|---|---|---|---|---|---|---|---|
| Carbon-based active material 4 | 2.5 | 135 | 132 | 128 | 136 | 146 | 148 | 140 | 156 | 135 | 90 |
| Carbon-based active material 5 | 4.4 | 131 | 113 | 110 | 98 | 139 | 145 | 150 | 149 | 124 | 44 |
| Carbon-based active material 6 | 8.9 | 126 | 101 | 88 | 52 | 134 | 136 | 141 | 149 | 124 | 56 |

The G band/D band ratio shown in Table 2 was measured as follows. Raman spectra of the carbon-based active materials 1-6 were obtained through Raman spectroscopy. Then, the area of G and D bands of the Raman spectra were obtained through mensuration by division.

The area of the G band was divided by the area of the D band to calculate the G band/D band ratio of the carbon-based active materials 1-6. "Ref" indicates a rechargeable lithium ion battery cell manufactured by substituting EC for the S=O-containing compound in the above manufacturing method.

In addition, a value corresponding to the combination of the carbon-based active material and the S=O-containing indicates discharge capacity at the 100 cycles. The discharge capacity is larger than the discharge capacity of the "Ref."

Referring to Table 1, DMSI, DMSA, ES, and EMS all improved cycle-life, when combined with the carbon-based active materials 3-6 having a G band/D band ratio of larger than 2. Accordingly, these S=O-containing compounds belonged to the first upper limit group of Table 1. In addition, the EiPS, EBS, and BS improved cycle-life when combined with the carbon-based active materials 1-2 having a G band/D band ratio of less than or equal to 2. Accordingly, these S=O-containing compounds belonged to the second division.

Example 2

[Manufacture of Rechargeable Lithium Ion Battery Cell]

Example 2 was performed in order to examine improvement of cycle-life without following a mixing ratio of the silicon-based active material and the carbon-based active material.

A rechargeable lithium ion battery cell 10 according to Example 2 was manufactured according to the same method as Example 1 except for the following.

A solid solution of $LiMnCoNiO_2$ and $Li_2MnO_3$ was used as a positive active material.

It had a specific composition of $Li_{1.20}Mn_{0.55}Co_{0.10}Ni_{0.15}O_2$.

(2) A negative electrode 30 included 47.0 wt % of a silicon alloy, 47.0 wt % of a carbon-based active material, and 6.0 wt % of a poly acrylic acid-based binder.

Accordingly, the negative electrode 30 included the silicon-based active material and the carbon-based active material in a weight ratio of 50/50.

(3) A solvent had a composition (a material and a volume ratio) of fluoro ethylene carbonate (FEC):S=O-containing compound:dimethyl carbonate (DMC):$HCF_{22}CH_2OCF_2H$ in a ratio of 10:5:45:40.

[Cycle Test]

Next, each rechargeable lithium ion battery cell 10 was cycle-tested. Specifically, a charge and discharge cycle was repeated 100 times by performing a constant current constant voltage charge at 3 $mA/cm^2$ until a cell voltage became 4.55 V and a constant current discharge until the cell voltage became 2.50 V. Then, discharge capacities at the first cycle and the 100th cycle were measured.

The initial discharge capacity of any rechargeable lithium ion battery cells 10 at the first cycle was 200 mAh. The discharge capacities (mAh) at the 100th cycle are provided in the following Table 3.

The above tests were all performed at 25° C. The discharge capacities were measured by using TOSCAT 3000 made by TOYO SYSTEM Co., Ltd. Table 3 shows a correspondence relation between the combination of the carbon-based active material and the S=O-containing compound and the discharge capacity at the 100th cycle.

TABLE 3

| | G band/D band ratio | Ref | EiPS | EBS | BS | DMSI | DMSA | ES | EMS | PS | SL |
|---|---|---|---|---|---|---|---|---|---|---|---|
| Carbon-based active material 1 | 1.4 | 80 | 108 | 105 | 97 | 72 | 66 | 50 | 56 | 72 | 0 |
| Carbon-based active material 2 | 2 | 73 | 83 | 86 | 78 | 55 | 48 | 38 | 57 | 74 | 0 |
| Carbon-based active material 3 | 2.3 | 76 | 68 | 62 | 76 | 82 | 80 | 83 | 87 | 73 | 49 |
| Carbon-based active material 4 | 2.5 | 76 | 74 | 72 | 76 | 82 | 83 | 78 | 87 | 76 | 50 |
| Carbon-based active material 5 | 5.9 | 73 | 63 | 62 | 55 | 78 | 81 | 84 | 83 | 69 | 25 |
| Carbon-based active material 6 | 6.3 | 58 | 62 | 57 | 40 | 75 | 80 | 77 | 80 | — | — |

Each parameter in Table 3 is the same as those in Table 2.

However, "Ref" indicates a rechargeable lithium ion battery cell manufactured by substituting the S=O-containing compound with FEC in the above manufacturing method.

"-" indicates that a measurement was not performed.

Referring to Table 3, when the carbon-based active material and the S=O-containing compound were appropriately combined, without following a mixing ratio of the silicon-based active material and the carbon-based active material, cycle-life was improved.

Example 3

[Manufacture of Rechargeable Lithium Ion Battery Cell]

Example 3 was performed to examine improvement of cycle-life without following a mixing ratio of the silicon-based active material and the carbon-based active material.

A rechargeable lithium ion battery cell 10 of Example 3 was manufactured according to the same method as Example 1.

A solid solution of LiMnCoNiO$_2$ and Li$_2$MnO$_3$ was used as a positive active material.

The positive active material had a specific composition of Li$_{1.20}$Mn$_{0.55}$Co$_{0.10}$Ni$_{0.15}$O$_2$.

(2) A negative electrode 30 included 81.8 wt % of a silicon alloy, 10.2 wt % of a carbon-based active material, and 6.0 wt % of a poly acrylic acid-based binder.

Accordingly, the negative electrode 30 included the silicon-based active material and the carbon-based active material in a weight ratio of about 80/10.

(3) A solvent had a composition (a material and a volume ratio) of FEC:S=O-containing compound:DMC:H(CF$_2$)$_2$CH$_2$O(CF$_2$)H in a ratio of 10:5:45:40.

[Cycle Test]

Next, each rechargeable lithium ion battery cell 10 was cycle-tested according to the same method as Example 2.

Table 4, below, shows a correspondence relation between combination of the carbon-based active material and the S=O-containing compound and the discharge capacity at the 100th cycle.

compound, regardless of a mixing ratio of the silicon-based active material and the carbon-based active material, cycle-life was improved.

Example 4

[Manufacture of Rechargeable Lithium Ion Battery Cell]

Example 4 was performed in order to examine improvement of storage capacity by the S=O-containing compound. A rechargeable lithium ion battery cell 10 was manufactured according to the same method as Example 1.

[Storage Capacity Evaluation]

Next, a storage capacity evaluation was performed on each rechargeable lithium ion battery 10.

Specifically, a charge and discharge cycle was repeated twice by performing a constant current constant voltage charge at 0.3 mA/cm$^2$ until a cell voltage became 4.40 V and a constant current discharge until the cell voltage became 2.75V. Then, the discharge capacity at the 2nd cycle was measured and used as an initial value.

The initial value was 200 mAh.

Then, a constant current constant voltage charge was performed at 0.3 mA/cm$^2$ until a cell voltage became 4.40 V, and the rechargeable lithium ion battery cell 10 was moved to a 60° C. thermostat after the charge and then, allowed to stand for 30 days.

Subsequently, the rechargeable lithium ion battery cell 10 was moved to a 25° C. thermostat and allowed to stand for 12 hours. Subsequently, discharge capacity of the rechargeable lithium ion battery cell 10 was measured by performing a constant current discharge at 0.3 mA/cm$^2$ until the cell voltage became 2.75 V. The discharge capacity was used as residual capacity.

The residual capacity is an index for evaluating how much a passivation film (formed by a decomposition product of the S=O-containing compound) remained when the rechargeable lithium ion battery cell 10 was stored for a long time after the charge.

A charge and discharge cycle was performed once by performing a constant current constant voltage charge at 0.3 mA/cm$^2$ until the cell voltage became 4.40 V, and a constant current discharge until the cell voltage became 2.75 V, and herein, the discharge capacity was regarded as recovery capacity.

TABLE 4

| | G band/D band ratio | Ref | EiPS | EBS | BS | DMSI | DMSA | ES | EMS | PS | SL |
|---|---|---|---|---|---|---|---|---|---|---|---|
| Carbon-based active material 9 | 0.6 | 80 | 130 | 130 | 110 | 10 | 35 | 46 | 50 | 0 | 0 |
| Carbon-based active material 2 | 2 | 35 | 85 | 76 | 53 | 18 | 21 | 30 | 40 | 0 | 0 |
| Carbon-based active material 3 | 2.3 | 26 | 30 | 33 | 31 | 99 | 116 | 125 | 138 | 0 | 0 |
| Carbon-based active material 7 | 5.9 | 30 | 30 | 32 | 30 | 84 | 88 | 90 | 102 | 0 | 0 |
| Carbon-based active material 8 | 6.3 | 30 | 28 | 22 | 18 | 71 | 78 | 81 | 82 | 0 | 0 |

Each parameter in Table 4 indicates the same as that in Table 2.

"Ref" indicates a rechargeable lithium ion battery cell manufactured by substituting the S=O-containing compound with FEC in the above manufacturing method.

Referring to Table 4, when the carbon-based active material was appropriately combined with the S=O-containing The above tests were all performed at 25° C. The discharge capacity was measured by using TOSCAT3000 made by TOYO SYSTEM Co., Ltd. Table 5, below, shows a correspondence relation between combinations of the carbon-based active material and the S=O-containing compound and the residual capacity, and Table 6, below, shows a correspondence relation between combinations of the carbon-based active material and the S=O-containing compound and the recovery capacity.

TABLE 5

| Residual | G band/D band ratio | Ref | EiPS | EBS | BS | DMSI | DMSA | ES | EMS | PS | SL |
|---|---|---|---|---|---|---|---|---|---|---|---|
| Carbon-based active material 1 | 1.4 | 74 | 85 | 85 | 82 | 46 | 42 | 50 | 73 | 38 | 9 |
| Carbon-based active material 2 | 2 | 65 | 77 | 80 | 80 | 48 | 42 | 48 | 60 | 52 | 9 |
| Carbon-based active material 3 | 2.3 | 50 | 42 | 38 | 50 | 63 | 65 | 69 | 69 | 61 | 4 |
| Carbon-based active material 4 | 2.5 | 70 | 54 | 40 | 60 | 76 | 72 | 77 | 80 | 66 | 9 |

TABLE 6

| Recovery | G band/D band ratio | Ref | EiPS | EBS | BS | DMSI | DMSA | ES | EMS | PS | SL |
|---|---|---|---|---|---|---|---|---|---|---|---|
| Carbon-based active material 1 | 1.4 | 80 | 94 | 92 | 92 | 51 | 47 | 61 | 80 | 55 | 71 |
| Carbon-based active material 2 | 2 | 76 | 84 | 86 | 87 | 55 | 50 | 58 | 74 | 63 | 64 |
| Carbon-based active material 3 | 2.3 | 63 | 63 | 63 | 61 | 74 | 71 | 74 | 78 | 63 | 63 |
| Carbon-based active material 4 | 2.5 | 80 | 78 | 64 | 74 | 88 | 83 | 78 | 90 | 83 | 16 |

Each parameter in Tables 5 and 6 indicates the same as that in Table 2.

"-" indicates that a measurement was not performed.

Referring to Tables 5 and 6, when the carbon-based active material was appropriately combined with the S=O-containing compound, storage capacity (i.e., residual capacity and recovery capacity) was improved.

Example 5

[Manufacture of Rechargeable Lithium Ion Battery Cell]

Example 5 was performed to examine improvement of storage capacity without following a mixing ratio of the silicon-based active material and the carbon-based active material. In Example 5, a rechargeable lithium ion battery cell 10 was manufactured according to the same method as Example 3.

[Storage Capacity Evaluation]

Next, storage capacity of each rechargeable lithium ion battery cell 10 was evaluated.

Specifically, a charge and discharge cycle was repeated (i.e., performed twice) by performing a constant current constant voltage charge at 0.3 mA/cm² until the cell voltage became 4.55 V and a constant current discharge until the cell voltage became 2.50 V.

Then, discharge capacity at the 2nd cycle was measured and regarded as an initial value. The initial value was 200 mAh.

Then, a constant current constant voltage charge at 0.3 mA/cm² was performed until the cell voltage became 4.55 V, and the rechargeable lithium ion battery cell 10 was moved to a 60° C. thermostat after the charge and allowed to stand for 30 days.

Subsequently, the rechargeable lithium ion battery cell 10 was moved to a 25° C. thermostat-controlled environment and allowed to stand for 12 hours. Subsequently, a constant current discharge at 0.3 mA/cm² was performed until the cell voltage became 2.50 V, and then, discharge capacity of the rechargeable lithium ion battery cell 10 was measured. This discharge capacity was used as residual capacity.

Then, a charge and discharge cycle was performed once by performing a constant current constant voltage charge at 0.3 mA/cm² until the cell voltage became 4.55 V and a constant current discharge until the cell voltage became 2.50 V, and herein, the discharge capacity was regarded as recovery capacity.

The above tests were all performed at 25° C. The discharge capacity was performed by using TOSCAT3000 made by TOYO System Co., Ltd. Table 7, below shows a correspondence relation between combinations of the carbon-based active material and the S=O-containing compound and the residual capacity, and Table 8, below, shows a correspondence relation between combinations of the carbon-based active material and the S=O-containing compound and the recovery capacity.

TABLE 7

| Residual | G band/D band ratio | Ref | EiPS | EiPS_10% | BS | DMSI | DMSA | ES | EMS | PS | SL |
|---|---|---|---|---|---|---|---|---|---|---|---|
| Carbon-based active material 9 | 0.6 | 60 | 80 | 88 | 72 | 55 | 44 | 53 | 59 | 0 | 0 |
| Carbon-based active material 7 | 5.9 | 46 | 44 | 28 | 22 | 58 | 52 | 58 | 78 | 5 | 3 |

TABLE 8

| Recovery | G band/D band ratio | Ref | EiPS | EiPS_10% | BS | DMSI | DMSA | ES | EMS | PS | SL |
|---|---|---|---|---|---|---|---|---|---|---|---|
| Carbon-based active material 9 | 0.6 | 71 | 90 | 95 | 83 | 68 | 52 | 62 | 68 | 0 | 5 |
| Carbon-based active material 7 | 5.9 | 68 | 64 | 30 | 27 | 72 | 70 | 73 | 93 | 14 | 9 |

Each parameter of Tables 7 and 8 indicate the same as that of Table 2.

"Ref" indicates a rechargeable lithium ion battery cell manufactured by substituting the S=O-containing compound with FEC in the above manufacturing method. "-" shows that a measurement was not performed. In addition, "EiPS_10%" indicates that EiPS was used in an amount of 10 volume %.

Referring to Tables 7 and 8, when the carbon-based active material was appropriately combined with the S=O-containing compound without following a mixing ratio of the silicon-based active material and the carbon-based active material, storage capacity (i.e., residual capacity and recovery capacity) was improved.

Therefore, in the rechargeable lithium ion battery cell 10 according to the present exemplary embodiment, the electrolyte solution 43 may include the S=O-containing compound having a structure that varies or is selected depending on the G band/D band ratio of the carbon-based active material, and battery characteristics are improved.

For example, in the rechargeable lithium ion battery cell 10, the S=O-containing compound belonging to the first division or group may be used when the carbon-based active material had a G band/D band ratio of greater than 2, and the S=O-containing compound belonging to the second division or group may be used when the carbon-based active material had a G band/D band ratio of less than or equal to 2. Accordingly, battery characteristics of the cell may be improved.

In addition, the second pores 42a in the porous layer 42 may have different characteristics from the first pores 41a in the substrate 41. Furthermore, the electrolyte solution 43 may include hydrofluoroether. Accordingly, cycle-life of the rechargeable lithium ion battery cell 10 may be remarkably improved. For example, the electrolyte solution around electrodes may be heavily held by the porous layer 42.

The porous layer 42 may help prevent electrochemical decomposition of the separator 40a.

The hydrofluoroether may help prevent electrochemical oxidation and decomposition of the electrolyte solution 43. These factors may remarkably improve cycle-life.

In addition, the porous layer 42 may be formed on both sides of the substrate 41. Thus, cycle-life may be further improved.

In addition, the second pores 42a may have a larger spherical diameter than that of the first pores 41a and may help prevent the separator 40a from clogging by a sediment. Accordingly, cycle-life may be improved.

In addition, porosity of the porous layer 42, e.g., porosity of the second pore 42a may be larger than porosity of the first pore 41a, e.g., porosity of the substrate 41, and may help prevent the separator 40a from clogging by a sediment. Accordingly, cycle-life may be improved.

The hydrofluoroether may be selected from 2,2,2-trifluoroethylmethylether, 2,2,2-trifluoroethyl difluoromethyl ether, 2,2,3,3,3-pentafluoropropylmethylether, 2,2,3,3,3-pentafluoropropyldifluoromethyl ether, 2,2,3,3,3-penta fluoropropyl-1,1,2,2-tetrafluoroethyl ether, 1,1,2,2-tetrafluoro ethylmethylether, 1,1,2,2-tetrafluoro ethylethylether, 1,1,2,2-tetrafluoro ethylpropylether, 1,1,2,2-tetrafluoro ethylbutylether, 1,1,2,2-tetrafluoro ethylisobutylether, 1,1,2,2-tetrafluoro ethylisopentylether, 1,1,2,2-tetrafluoroethyl-2,2,2-trifluoro ethylether, 1,1,2,2-tetrafluoroethyl-2,2,3,3-tetrafluoro propylether, hexafluoro isopropylmethylether, 1,1,3,3,3-penta fluoro-2-trifluoro methylpropylmethylether, 1,1,2,3,3,3-hexafluoro propylmethylether, 1,1,2,3,3,3-hexafluoro propylethylether, or 2,2,3,4,4,4-hexafluoro butyldifluoromethylether.

As shown in the Examples, above, when the hydrofluoroether is these above materials, cycle-life may be remarkably improved.

In an implementation, the electrolyte solution 43 may include the hydrofluoroether in an amount of 10 volume % to 60 volume %, based on the total volume of the electrolyte solution 43, and cycle-life may also be remarkably improved.

Furthermore, the electrolyte solution may include at least one of linear carbonate ester and fluoro ethylene carbonate, and battery characteristics may be much improved.

Examples 6-9 and Comparative Example 1

[Manufacture of Rechargeable Lithium Ion Battery Cell]

Example 6 was performed to examine improvement of cycle-life by the first and second additives. First, a rechargeable lithium ion battery cell 10 was manufactured as follows. For a positive electrode 20, 78.4 wt % of $LiCoO_2$, 19.6 wt % of $LiNi_{0.5}Co_{0.2}Mn_{0.3}O_2$, 1 wt % of polyvinylidene fluoride, and 1 wt % of KETJEN BLACK were dispersed into N-methyl-2-pyrrolidone, forming a slurry. Subsequently, the slurry was coated on an aluminum thin film as a current collector 21 and dried to form a positive active material layer 22. Subsequently, the positive active material layer 22 was pressed with a press to have a density of 4.0 g/cm³. In this way, the positive electrode 20 was manufactured.

As for a negative electrode 30, 7.0 wt % of a silicon alloy (Si:Al:Fe=55:29:16 (a weight ratio)), 91.0 wt % of a carbon-based active material having a G band/D band ratio of 6.3, 0.7 wt % of a styrene butadiene rubber (SBR), and 0.3 wt % of carboxylmethylcellulose sodium (CMC-Na) were dispersed into water, forming a slurry. Subsequently, the slurry was coated on an aluminum thin film as a current collector 31 and dried to form a negative active material layer 32. Subsequently, the negative active material layer 32 was pressed with a press to have a density of 1.45 g/cm³.

Herein, the carbon-based active material had a G band/D band ratio measured as follows. First, a Raman spectrum of the carbon-based active material was obtained through Raman spectroscopy. The area of G and D bands of the Raman spectrum was obtained by mensuration by division. The area of the G band was divided by the area of the D band to calculate the G band/D band ratio of the carbon-based active material.

For a separator 40a, Aramid (poly[N,N'-(1,3-phenylene) isophthalamide], Sigma-Aldrich Co. Japan) and a water-soluble organic solvent were mixed in a ratio of 5.5:94.5 wt %, preparing a coating solution. Herein, the water-soluble organic solvent was prepared by mixing DMAc and TPG in a weight ratio of 50:50.

A porous polyethylene film (a thickness of 13 μm, porosity of 42%) was used as a substrate 41. Subsequently, a coating solution was coated to be 2 μm thick on both sides of the substrate. Then, the coated substrate 41 was impregnated in a coagulation solution to coagulate the resin in the coating solution. In this way, the separator 40a was manufactured. Herein, the coagulation solution was prepared by mixing DMAc and TPG in a ratio of 50:25:25. Subsequently, the separator 40a was washed and dried to remove the water-soluble organic solvent from the separator 40a. The separator 40a had a spherical diameter distribution of 0.1-2 μm, porosity of 50%, and air permeability of 260 (sec/100 cc).

Subsequently, the separator 40a was interposed between the positive electrode 20 and the negative electrode 30, manufacturing an electrode structure. Then, the electrode structure was inserted in a test container. A basic electrolyte solution was manufactured by mixing FEC, DMC, and $HCF_2CF_2OCH_2CF_2CF_2H$ in a volume ratio of 15:45:40 to prepare a solvent and dissolving lithium hexafluoro phosphate in a concentration of 1.3 mol/L in the mixed solvent. Subsequently, the additives 1-1 and 2-1 were added to the basic electrolyte solution to prepare an experimental electrolyte solution. Herein, the additive 1-1 was added in an amount of 2 wt % to the experimental electrolyte solution based on the total weight of the experimental electrolyte solution, and the additive 2-1 was added in an amount of 0.6 wt %, based on the total weight f the experimental electrolyte solution.

Subsequently, the electrolyte solution was injected into the test container to impregnate each pore in the separator 40a with the electrolyte solution. In this way, the rechargeable lithium ion battery cell 10 for an evaluation was manufactured.

[Cycle Test]

Next, a cycle test on each rechargeable lithium ion battery cell 10 was performed. Specifically, the rechargeable lithium ion battery cell was first charged and discharged at 25° C. by performing a constant current constant voltage charge at 0.3 mA/cm² until the cell voltage became 4.45 V and a discharge until the cell voltage became 2.75 V. Subsequently, 100 charge and discharge cycles were performed by performing a constant current constant voltage charge cell voltage at 3 mA/cm² until the cell voltage became 4.45 V and a constant current discharge at 3 mA/cm² until the cell voltage became 2.75 V. Then, discharge capacity (mAh) at each cycle was measured. On the other hand, the above test was performed at 45° C. from the $2^{nd}$ cycle (only the first cycle was performed at 25° C.). The discharge capacity was measured by using TOSCAT3000 (TOYO SYSTEM CO., LTD.).

Examples 7 to 9 and Comparative Example 1

The same treatment as Example 1 was performed, except for changing a kind of and the amount of the additives added to the basic electrolyte solution as shown in Table 9, below.

TABLE 9

| | First additive (wt %) | Second additive (wt %) | |
|---|---|---|---|
| | (1-1) | (2-1) | (2-2) |
| Example 6 | 2.0 | 0.6 | — |
| Example 7 | 2.0 | — | 1.4 |
| Example 8 | — | 0.6 | — |
| Example 9 | 2.0 | — | — |
| Comparative Example 1 | — | — | — |

The numbers in Table 9 indicate wt % based on the total weight of the experimental electrolyte solution (the basic electrolyte solution+additives). In addition, "-" indicates no addition of the additives. Accordingly, Comparative Example 1 included neither first nor second additive (the basic electrolyte solution itself was used as an experimental electrolyte solution).

FIG. 6 shows a correlation between discharge capacity of Examples 6-9 and Comparative Example 1 and the number of cycles. FIG. 6 shows a discharge capacity trend curve from the $2^{nd}$ cycle to the 101th cycle. As shown in FIG. 6, when either one of the first and second additives was added to the basic electrolyte solution, cycle-life (discharge capacity) was a little improved, but when both of the additives were added to the basic electrolyte solution, cycle-life was remarkably improved.

Examples 10-15 and Comparative Example 2

[Manufacture of Rechargeable Lithium Ion Battery Cell]

Examples 10-15 and Comparative Example 2 were performed to examine a boundary value of the content of each additive. In Example 10, a rechargeable lithium ion battery cell 10 was manufactured through the following treatment.

A positive electrode 20 was manufactured through the same treatment as Example 6 except for changing the composition of the solid solution in the positive active material into $Li_{1.20}Mn_{0.55}Co_{0.10}Ni_{0.15}O_2$ and using the solid solution, polyvinylidene fluoride and KETJEN BLACK in a weight ratio of 90:4:6.

(2) As for a negative electrode 30, 80 wt % of a silicon alloy (Si:Al:Fe=55:29:16 (a weight ratio)), 10 wt % of a carbon-based active material having a G band/D band ratio of 0.6, 6.0 wt % of polyimide (PI), and 4.0 wt % of KETJEN BLACK were dispersed into N-methyl-2-pyrrolidone to form a slurry. The negative electrode 30 was manufactured according to the same treatment as Example 6 except for this above change.

(3) A basic electrolyte solution was prepared according to the same procedure as Example 6. The additives 1-1 and 2-2 were added to the basic electrolyte solution to prepare an experimental electrolyte solution. The additive 1-1 was included in an amount of 1.0 wt % based on the total weight of the experimental electrolyte solution, and the additive 2-2 was included in an amount of 1.0 wt % based on the total amount of the experimental electrolyte solution. A rechargeable lithium ion battery cell 10 was manufactured according to the same treatment as Example 6 except for this above change.

[Cycle Test]

Next, a cycle test was performed on the rechargeable lithium ion battery cell 10. Specifically, the cell was first charged and discharged at 25° C. and then, constant current constant voltage charged at 0.3 mA/cm$^2$ until the cell voltage became 4.65 V and discharged until the cell voltage became 2.00 V. Subsequently, 300 charge and discharge cycles were repeated by performing a constant current constant voltage charge cell voltage at 3 mA/cm$^2$ until the cell voltage became 4.55 V and a constant current discharge at 3 mA/cm$^2$ until the cell voltage became 2.00 V. Then, discharge capacity (mAh) of the cell at each cycle was measured. The test was performed at 45° C. after the 2$^{nd}$ cycle.

Examples 11-15 and Comparative Example 2

The same treatment as Example 10 was performed by changing the kind of and the amount of additives added to the basic electrolyte solution as shown in Table 10, below.

TABLE 10

| | First additive (wt %) | Second additive (wt %) | |
|---|---|---|---|
| | (1-1) | (2-1) | (2-2) |
| Example 10 | 1.0 | — | 1.0 |
| Example 11 | 1.0 | 0.5 | — |
| Example 12 | 4.0 | 0.5 | — |
| Example 13 | 2.0 | 0.5 | — |
| Example 14 | 2.0 | 0.25 | — |
| Example 15 | 2.0 | 1.0 | — |
| Comparative Example 2 | — | — | — |

The values in Table 10 indicate wt % of the additives based on the total weight of the experimental electrolyte solution (the basic electrolyte solution+additives). In addition, "—" indicates no addition of the additives. Accordingly, neither first nor second additive in Comparative Example 2 was added (the basic electrolyte solution itself was used as an experimental electrolyte solution).

Figure 7:
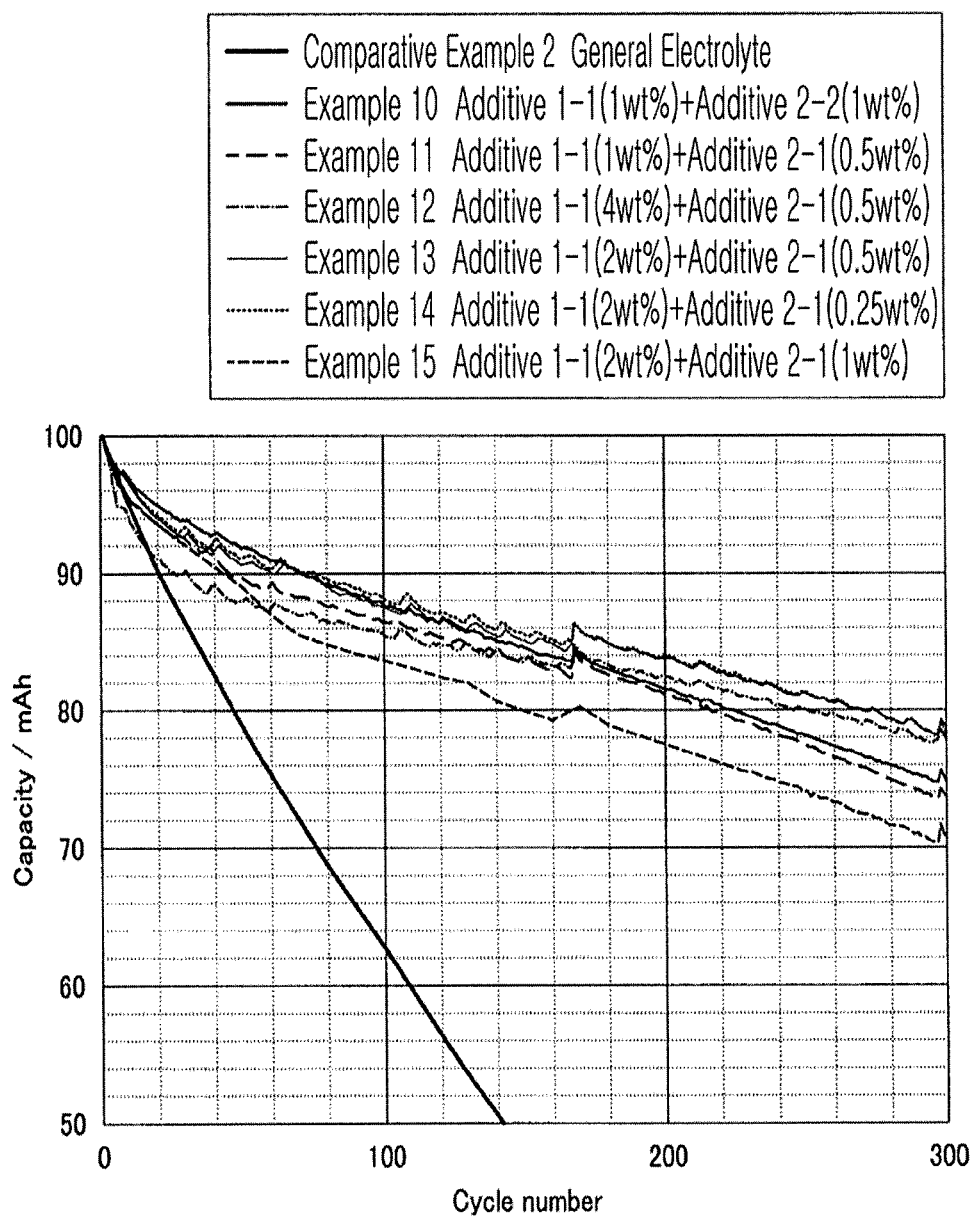
FIG. 7 illustrates a graph showing correspondence relationship between the number of cycles of the rechargeable lithium ion battery and its discharge capacity.

FIG. 7 shows a correlation between discharge capacity of Examples 10-15 and Comparative Example 2 and the number of cycles. FIG. 7 shows a discharge capacity trend curve from the 2$^{nd}$ cycle to the 301st cycle. As shown in FIG. 7, when the first and second additives were added to the basic electrolyte solution within the above wt % range, cycle-life was remarkably improved.

Examples 16-18 and Comparative Example 3

[Manufacture of Rechargeable Lithium Ion Battery Cell]

Examples 16-18 and Comparative Example 3 were performed to examine if the same effect was obtained when a kind of the second additive was changed. An experimental electrolyte solution of Example 16 was obtained by performing the same treatment as Example 10.

A basic electrolyte solution was prepared by mixing FEC, ethylisopropylsulfone (EiPS), DMC, and $C_2F_5CH_2OCF_2CHFCF_3$ in a volume ratio of 5:10:45:40 to prepare a solvent and dissolving lithium hexafluoro phosphate in a concentration of 1.3 mol/L in the mixed solvent. Subsequently, additives 1-1 and 2-1 were added to the basic electrolyte solution to prepare an experimental electrolyte solution. The additive 1-1 was added in an amount of 2 wt % to the experimental electrolyte solution, and the additive 2-1 was added in an amount of 1.0 wt % to the experimental electrolyte solution.

Examples 17-18 and Comparative Example 3

The same treatment as Example 16 was performed except for changing a kind of and the amount of additive added to the basic electrolyte solution as shown in Table 11, below.

TABLE 11

| | First additive (wt %) | Second additive (wt %) | | |
|---|---|---|---|---|
| | (1-1) | (2-1) | (2-5) | (2-6) |
| Example 16 | 2.0 | 1.0 | — | — |
| Example 17 | 2.0 | — | 1.0 | — |
| Example 18 | 2.0 | — | — | 1.0 |
| Comparative Example 3 | — | — | — | — |

The values in Table 11 indicate wt % based on the total weight of the experimental electrolyte solution (the basic electrolyte solution+additives). In addition, "—" indicates no addition of the additives. Accordingly, in Comparative Example 3, neither first nor second additive was added (a basic electrolyte solution itself was used as an experimental electrolyte solution).

Figure 8:
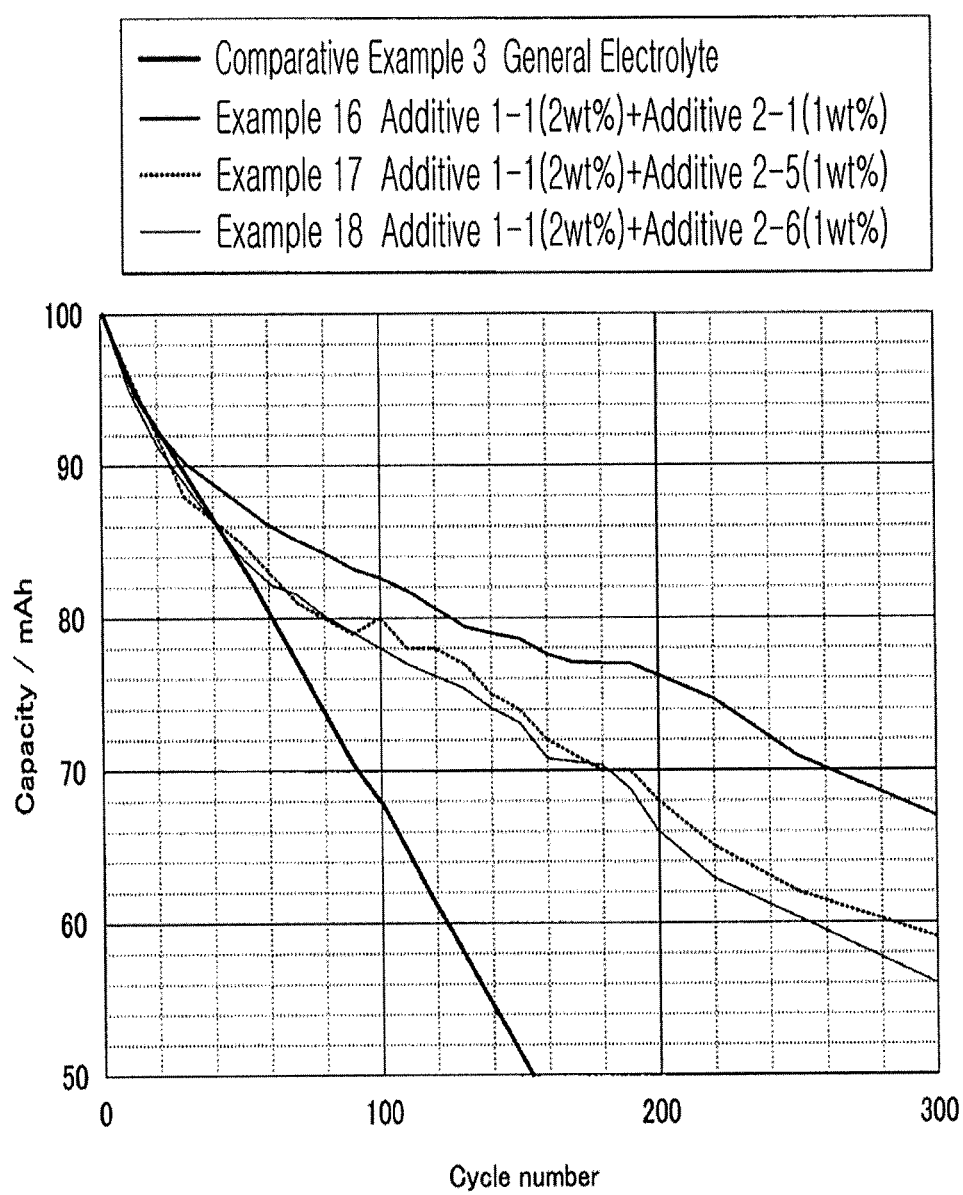
FIG. 8 illustrates a graph showing correspondence relationship between the number of cycles of the rechargeable lithium ion battery and its discharge capacity.

FIG. 8 shows a correlation between discharge capacity of Examples 16-18 and Comparative Example 3 and the number of cycles. FIG. 8 shows a discharge capacity trend curve from the 2$^{nd}$ cycle to the 301$^{st}$ cycle. As shown in FIG. 8, when the second additive was changed to the additives 2-5 and 2-6 and combined with the first additive, cycle-life may be remarkably improved.

Example 19 and Comparative Example 4

[Manufacture of Rechargeable Lithium Ion Battery Cell]

Example 19 and Comparative Example 4 were performed to examine an increase effect by the S=O-containing compound and the first and second additives, depending on the G band/D band ratio of the carbon-based active material. In Example 19, a rechargeable lithium ion battery cell 10 was manufactured through the following treatments.

A positive electrode 20 was manufactured by performing the same treatment as Example 6 except for changing the composition of a solid solution in the positive active material into $Li_{1.20}Mn_{0.55}Co_{0.10}Ni_{0.15}O_2$ and then, mixing the solid solution, polyvinylidene fluoride and KETJEN BLACK in a weight ratio of 90:4:6.

For a negative electrode 30, 45 wt % of a silicon alloy (Si:Al:Fe=55:29:16 (a weight ratio)), 45 wt % of a carbon-based active material having a G band/D band ratio of 8.0, 6.0 wt % of polyimide (PI), and 4.0 wt % of KETJEN BLACK were dispersed into N-methyl-2-pyrrolidone to form a slurry. The negative electrode 30 was manufactured by performing the same treatment as Example 6 except for the above change.

For an electrolyte solution 43, a basic electrolyte solution was prepared by mixing FEC, EMS, DMC, and $C_2F_5CH_2OCF_2CHFCF_3$ in a volume ratio of 12:3:45:40 to prepare a solvent and dissolving lithium hexafluoro phosphate in a concentration of 1.3 mol/L in the mixed solution. Subsequently, the additives 1-1 and 2-1 were added to the basic electrolyte solution to prepare an experimental electrolyte solution. The additive 1-1 was included in an amount of 2 wt % based on the total weight of the experimental electrolyte solution, and the additive 2-1 was included in an amount of 0.5 wt % based on the total weight of the experimental electrolyte solution.

Figure 9:
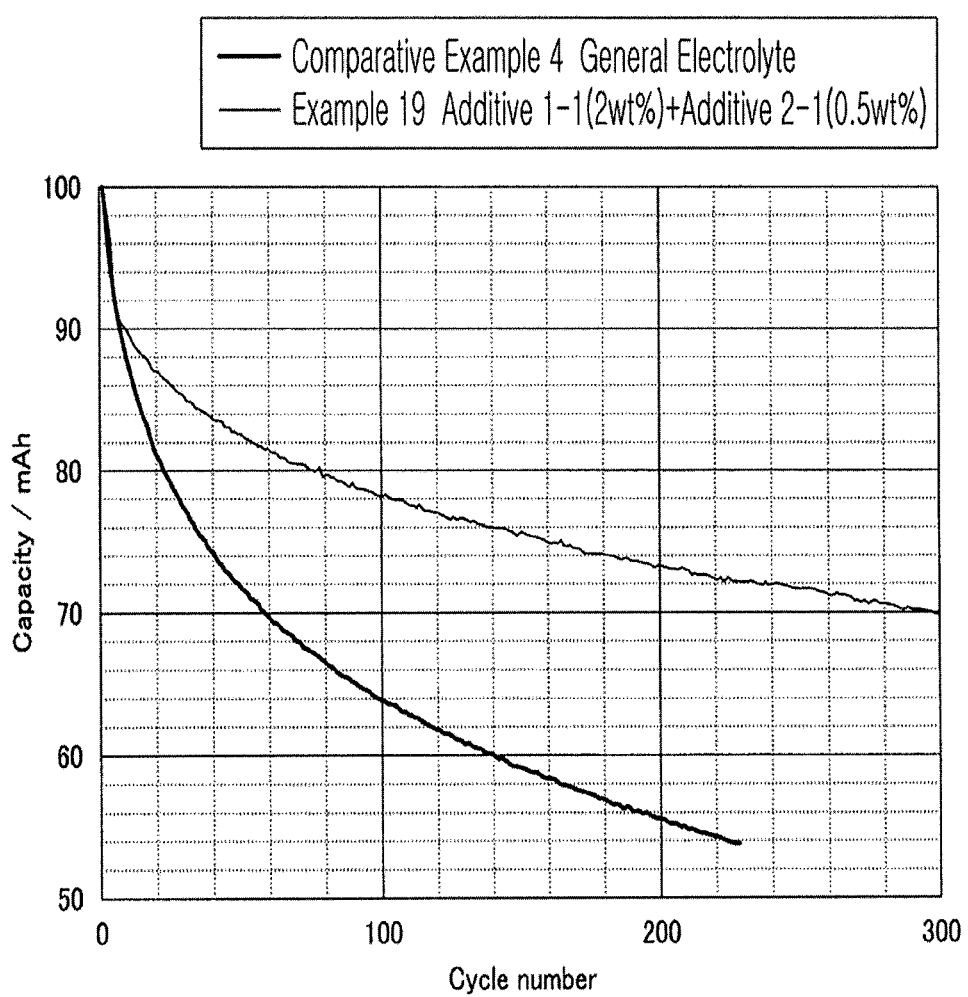
FIG. 9 illustrates a graph showing correspondence relationship between the number of cycles of the rechargeable lithium ion battery and its discharge capacity.

Then, the same cycle test as Example 10 was performed. FIG. 9 shows a correlation between discharge capacity of Example 19 and Comparative Example 4 and the number of cycles. FIG. 9 shows a discharge capacity trend curve from the $2^{nd}$ cycle to the $301^{st}$ cycle. As shown in FIG. 9, when the S=O-containing compound as well as the first and second additives was added to the electrolyte solution 43 depending on the G band/D band ratio of the carbon-based active material, cycle-life may be much improved.

The rechargeable lithium ion battery cell 10 according to an embodiment may include an electrolyte solution including the first additive having a structure represented by the above Chemical Formula 1a or 1b and the second additive having a structure represented by the above Chemical Formula 2a, and may exhibit much improved cycle-life. In addition, if the rechargeable lithium ion battery cell were to be operated at current density satisfying a level of practical application, its cycle-life may be improved.

Furthermore, in Chemical Formulae 1a and 1b, X may be boron or phosphorus, and Y may be oxygen. Herein, cycle-life may be much improved.

In addition, the first additive may include tris(trifluoromethyl)phosphoric acid, and cycle-life may be much improved.

Furthermore, in Chemical Formula 2a, M may be boron or phosphorus, and herein, cycle-life may be much improved.

In addition, the second additive may include one of lithium difluoro(oxalato-O,O')borate and lithium difluoro bis(oxalato-O,O')phosphate, and herein, cycle-life may be much improved.

Furthermore, characteristics of the second pores 42a in the porous layer 42 may be different from the first pores 41a in the substrate 41. In addition, the electrolyte solution 43 may include hydrofluoroether. Accordingly, the rechargeable lithium ion battery cell 10 may exhibit remarkably improved cycle-life. For example, the electrolyte solution around the electrode may be firmly retained by the porous layer 42. The porous layer 42 may help prevent electrochemical decomposition of the separator 40a. The hydrofluoroether may help prevent electrochemical decomposition of the electrolyte solution 43. These factors may help remarkably improve cycle-life.

In an implementation, the porous layer 42 may be formed on both sides of the substrate 41. Herein, cycle-life may be much improved.

In addition, the second pore 42a may have a larger diameter than that of the first pore 41a and thus, may help prevent clogging of the separator 40a by a sediment. Accordingly, cycle-life may be improved.

In an implementation, porosity of the porous layer 42, e.g., porosity of the second pore 42a may be larger than porosity of the first pore 41a, e.g., porosity of the substrate 41, and clogging (by a sediment) of the separator 40a may be prevented. Accordingly, cycle-life may be improved.

The hydrofluoroether may be selected from, e.g., 2,2,2-trifluoroethylmethylether, 2,2,2-trifluoroethyl difluoromethyl ether, 2,2,3,3,3-pentafluoropropylmethylether, 2,2,3,3,3-pentafluoropropyldifluoromethyl ether, 2,2,3,3,3-penta fluoropropyl-1,1,2,2-tetrafluoroethyl ether, 1,1,2,2-tetrafluoro ethylmethylether, 1,1,2,2-tetrafluoro ethylethylether, 1,1,2,2-tetrafluoro ethylpropylether, 1,1,2,2-tetrafluoro ethylbutylether, 1,1,2,2-tetrafluoro ethylisobutylether, 1,1,2,2-tetrafluoro ethylisopentylether, 1,1,2,2-tetrafluoroethyl-2,2,2-trifluoro ethylether, 1,1,2,2-tetrafluoroethyl-2,2,3,3-tetrafluoro propylether, hexafluoro isopropylmethylether, 1,1,3,3,3-penta fluoro-2-trifluoro methylpropylmethylether, 1,1,2,3,3,3-hexafluoro propylmethylether, 1,1,2,3,3,3-hexafluoro propylethylether, or 2,2,3,4,4,4-hexafluoro butyldifluoromethylether. As shown in the above Examples, when the hydrofluoroether includes these materials, cycle-life may be much improved.

In an implementation, the electrolyte solution 43 may include 10-60 volume % of hydrofluoroether based on the total volume of the electrolyte solution 43, and cycle-life may be much improved.

In an implementation, the electrolyte solution may include one of linear carbonate ester or fluoro ethylene carbonate, and battery characteristics may be much improved.

By way of summation and review, when the metal-based or metalloid-based active material has a high specific capacity (mAh/g) and is used as a negative active material for a rechargeable lithium ion battery, the rechargeable lithium ion battery may have high energy density.

A silicon-based active material may be particularly easily reacted with or decomposed by $LiPF_6$ and ethylene carbonate as a main solvent during charge, unlike a graphite active material. In addition, the silicon-based active material may have a greater volume change than that of the graphite active material during charge and discharge and thus, may have an unreacted side (a newly produced side due to the breakage by the volume expansion of the silicon-based active material) with the $LiPF_6$ and the ethylene carbonate during every charge and discharge.

The $LiPF_6$ and the ethylene carbonate may react with the new side of the silicon-based active material and thus, may be decomposed during every charge and discharge. Accordingly, a rechargeable lithium ion battery using a silicon-based active material may exhibit remarkably deteriorated charge and discharge efficiency and a sharply deteriorated cycle-life.

A negative active material may be formed of an amorphous or non-crystalline silicon thin film and a carbonate compound substituted with a fluorine atom easily bonding with a silicon atom for a hydrogen atom as an electrolyte solution. Another negative active material may be formed of silicon and a transition metal and internally having a pore thereinside.

An electrolyte may include tris(trimethylsilyl)phosphoric acid) and difluoro(oxolato-O,O')lithium borate in order to help improve the cycle-life characteristics of the rechargeable lithium ion battery.

Some rechargeable lithium ion batteries still show insufficient practical characteristics in terms of cycle-life or storage capacity.

The embodiments may provide a rechargeable lithium ion battery having excellent practical characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable lithium ion battery, comprising
a negative electrode including a negative active material, the negative active material including a carbon-based active material,
a positive electrode including a compressed positive active material layer, the compressed positive active material layer in the rechargeable lithium ion battery having a density of 2.0 g/cm$^3$ to 3.0 g/cm$^3$; and
an electrolyte solution that includes a S=O-containing compound, the S=O-containing compound including dimethyl sulfurous acid, diethyl sulfurous acid, ethylene sulfurous acid, dimethyl sulfuric acid, or diethyl sulfuric acid, and
the S=O-containing compound is included in the electrolyte in an amount of about 0.5 volume % to less than 5.0 volume %, based on a total volume of the electrolyte solution.

2. The rechargeable lithium ion battery as claimed in claim 1, wherein:
the electrolyte solution further includes an additive, the additive including a compound represented by one of the following Chemical Formula 1a or 1b:

[ChemicalFormula 1a]

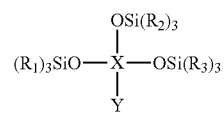

[Chemical Formula 1b]

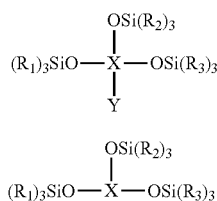

X is a Group 13 element, a Group 14 element, or a Group 15 element,
Y is a Group 16 element, and
$R_1$ to $R_3$ are each independently a substituted or unsubstituted C1 to C4 alkyl group.

3. The rechargeable lithium ion battery as claimed in claim 1, wherein:

the electrolyte solution further includes an additive, the additive including a compound represented by the following Chemical Formula 2a:

[Chemical Formula 2a]

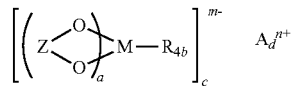

A is a Group 1A element, a Group 2A element, or aluminum,
M is a transition metal, a Group 3B element, a Group 4B element, or a Group 5B element,
$R_4$ is a halogen,
Z is —OC—$R_{51}$—CO—, —OC—C($R_{52}$)$_2$—, or —OC—CO—, in which $R_{51}$ is an alkylene group, a halogenated alkylene group, an arylene group, or a halogenated arylene group, and each $R_{52}$ is independently an alkyl group, a halogenated alkyl group, an aryl group, or a halogenated aryl group,
a is an integer of 1 to 4,
b is 0, 2, or 4, and
c, d, m, and n are each independently integers of 1 to 3.

4. The rechargeable lithium ion battery as claimed in claim 1, wherein:
the electrolyte solution includes:
a first additive, the first additive including a compound represented by one of Chemical Formula 1a or 1b, and
a second additive, the second additive including a compound represented by Chemical Formula 2a:

[Chemical Formula 1a]

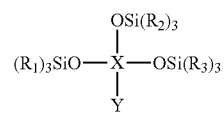

[Chemical Formula 1b]

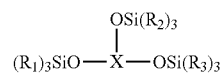

X is a Group 13 element, a Group 14 element, or a Group 15 element,
Y is a Group 16 element, and
$R_1$ to $R_3$ are each independently a substituted or unsubstituted C1 to C4 alkyl group,

[Chemical Formula 2a]

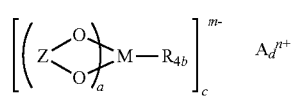

A is a Group 1A element, a Group 2A element, or aluminum,
M is a transition metal, a Group 3B element, a Group 4B element, or a Group 5B element,
$R_4$ is a halogen,
Z is —OC—$R_{51}$—CO—, —OC—C($R_{52}$)$_2$—, or —OC—CO—, in which $R_{51}$ is an alkylene group, a halogenated alkylene group, an arylene group, or a halogenated arylene group, and each $R_{52}$ is independently an alkyl group, a halogenated alkyl group, an aryl group, or a halogenated aryl group, a is an integer of 1 to 4, b is 0, 2, or 4, and c, d, m, and n are each independently integers of 1 to 3.

5. The rechargeable lithium ion battery as claimed in claim 2, wherein:

X is boron or phosphorus, and

Y is oxygen.

6. The rechargeable lithium ion battery as claimed in claim 2, wherein the additive includes tris(trifluoromethyl)phosphoric acid.

7. The rechargeable lithium ion battery as claimed in claim 3, wherein M is boron or phosphorus.

8. The rechargeable lithium ion battery as claimed in claim 3, wherein the additive includes at least one of lithium difluoro(oxalato-O,O') borate and lithium difluoro bis(oxalato-O,O')phosphate.

9. The rechargeable lithium ion battery as claimed in claim 2, wherein the additive is included in the electrolyte solution in an amount of about 1 wt % to about 4 wt %, based on a total weight of the electrolyte solution.

10. The rechargeable lithium ion battery as claimed in claim 3, wherein the additive is included in the electrolyte solution in an amount of greater than or equal to about 0.25 wt %, based on a total weight of the electrolyte solution.

11. The rechargeable lithium ion battery as claimed in claim 4, wherein:

the first additive is included in the electrolyte solution in an amount of about 1 wt % to about 4 wt %, based on a total weight of the electrolyte solution, the second additive is included in the electrolyte solution in an amount of greater than or equal to about 0.25 wt %, based on the total weight of the electrolyte solution, and a total weight of the first additive and the second additive in the electrolyte solution is less than or equal to 5 wt %, based on the total weight of the electrolyte solution.

12. The rechargeable lithium ion battery as claimed in claim 1, wherein the electrolyte solution includes hydrofluoroether.

13. The rechargeable lithium ion battery as claimed in claim 1, wherein the electrolyte solution includes at least one of a linear carbonate ester or a fluoro ethylene carbonate.

14. The rechargeable lithium ion battery as claimed in claim 1, wherein the negative active material includes a silicon-based active material.

15. The rechargeable lithium ion battery as claimed in claim 14, wherein the silicon-based active material includes Si, a Si-based alloy, $SiO_x$, in which $0<x<2$, or a combination thereof.

16. The rechargeable lithium ion battery as claimed in claim 1, wherein the compressed positive active material layer in the rechargeable lithium ion battery has a density of 2.5 g/cm$^3$ to 3.0 g/cm$^3$.

17. The rechargeable lithium ion battery as claimed in claim 1, wherein the S=O-containing compound includes dimethyl sulfurous acid, diethyl sulfurous acid, ethylene sulfurous acid, or diethyl sulfuric acid.

18. The rechargeable lithium ion battery as claimed in claim 1, wherein the S=O-containing compound includes dimethyl sulfurous acid, ethylene sulfurous acid, or diethyl sulfuric acid.

* * * * *